US010937287B2

(12) United States Patent
Kim et al.

(10) Patent No.: US 10,937,287 B2
(45) Date of Patent: Mar. 2, 2021

(54) SENSOR FOR CAPTURING IMAGE AND METHOD FOR CONTROLLING THE SAME

(71) Applicant: Samsung Electronics Co., Ltd., Suwon-si (KR)

(72) Inventors: Dong-Soo Kim, Suwon-si (KR);
Shuichi Shimokawa, Suwon-si (KR);
Hwa-Young Kang, Suwon-si (KR);
Young-Kwon Yoon, Seoul (KR);
Moon-Soo Kim, Seoul (KR);
Jong-Hun Won, Suwon-si (KR);
Ki-Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 15/886,667

(22) Filed: Feb. 1, 2018

(65) Prior Publication Data
US 2018/0225941 A1 Aug. 9, 2018

(30) Foreign Application Priority Data
Feb. 3, 2017 (KR) .................. 10-2017-0015860

(51) Int. Cl.
*G08B 13/196* (2006.01)
*H04N 19/172* (2014.01)
(Continued)

(52) U.S. Cl.
CPC ... *G08B 13/1961* (2013.01); *G08B 13/19604* (2013.01); *G08B 13/19606* (2013.01);
(Continued)

(58) Field of Classification Search
CPC ...... H04N 7/013; H04N 5/144; H04N 19/139; H04N 19/172; G08B 13/1961;
(Continued)

(56) References Cited

U.S. PATENT DOCUMENTS 7,180,429 B2 2/2007 Calderwood
7,362,949 B2 4/2008 Jun et al.
(Continued)

FOREIGN PATENT DOCUMENTS

CN 1992858 A 7/2007
CN 101271518 A 9/2008
(Continued)

OTHER PUBLICATIONS

International Search Report dated May 8, 2018 in connection with International Patent Application No. PCT/KR2018/001244.
(Continued)

*Primary Examiner* — Pinalben Patel

(57) ABSTRACT

According to an embodiment of the present disclosure, an electronic device may comprise an image sensor and one or more processors configured to obtain a first plurality of image frames for an external object as per a first frame rate, detect a variation associated with the external object, when the variation meets a designated condition, obtain a second plurality of image frames for the external object as per the first frame rate or a second frame rate, generate a first portion of a video using at least some of the first plurality of image frames, generate a second portion of the video using at least some of the second plurality of image frames, and generate a third portion of the video using at least some of a third plurality of image frames for the external object obtained as per the first frame rate or a third frame rate.

9 Claims, 23 Drawing Sheets

(51) Int. Cl.
  *H04N 5/14* (2006.01)
  *H04N 19/139* (2014.01)
  *H04N 7/01* (2006.01)
(52) U.S. Cl.
  CPC . *G08B 13/19667* (2013.01); *G08B 13/19676* (2013.01); *H04N 5/144* (2013.01); *H04N 7/013* (2013.01); *H04N 19/139* (2014.11); *H04N 19/172* (2014.11)
(58) Field of Classification Search
  CPC ........ G08B 13/19604; G08B 13/19606; G08B 13/19667; G08B 13/19676
  See application file for complete search history.

(56) References Cited

U.S. PATENT DOCUMENTS

| | | |
|---|---|---|
| 7,454,078 B2 | 11/2008 | Ramamurthy |
| 9,402,034 B2 | 7/2016 | Price et al. |
| 2006/0285831 A1 | 12/2006 | Tanaka |
| 2007/0115459 A1 | 5/2007 | Nakao et al. |
| 2007/0189728 A1 | 8/2007 | Yu |
| 2008/0231709 A1 | 9/2008 | Brown et al. |
| 2010/0013981 A1 | 1/2010 | Yasuda |
| 2010/0034521 A1 | 2/2010 | Yano et al. |
| 2010/0053345 A1 | 3/2010 | Kim et al. |
| 2010/0060752 A1 | 3/2010 | Tokuyama |
| 2012/0176505 A1* | 7/2012 | Kim .................. H04N 5/23219 348/222.1 |
| 2014/0336796 A1* | 11/2014 | Agnew ................ A43B 3/0005 700/91 |
| 2016/0119530 A1 | 4/2016 | Chen et al. |
| 2016/0286127 A1 | 9/2016 | Zhao |

FOREIGN PATENT DOCUMENTS

| | | |
|---|---|---|
| CN | 101529890 A | 9/2009 |
| CN | 101583902 A | 11/2009 |
| CN | 102957864 A | 3/2013 |
| CN | 104007817 A | 8/2014 |
| CN | 104394312 A | 3/2015 |
| CN | 104618656 A | 5/2015 |
| CN | 106161911 A | 11/2016 |
| JP | 2004120384 A | 4/2004 |
| JP | 5084741 B2 | 11/2012 |
| JP | 2014049798 A | 3/2014 |

OTHER PUBLICATIONS

Written Opinion of the International Searching Authority dated May 8, 2018 in connection with International Patent Application No. PCT/KR2018/001244.

Supplementary European Search Report dated Oct. 7, 2019 in connection with European Patent Application No. 18 74 7870, 10 pages.

The First Office Action dated Dec. 25, 2020 in connection with Chinese Application No. 201880010274.5, 18 pages.

\* cited by examiner

SENSOR FOR CAPTURING IMAGE AND METHOD FOR CONTROLLING THE SAME

CROSS-REFERENCE TO RELATED APPLICATION AND CLAIM OF PRIORITY

This application is related to and claims priority to Korean Patent Application No. 10-2017-0015860 filed on Feb. 3, 2017, the contents of which are incorporated herein by reference.

TECHNICAL FIELD

The present disclosure relates to sensors for capturing images and methods for controlling the same.

DISCUSSION OF RELATED ART

Recently, electronic devices are providing more diversified services and additional functions. There are being developed various applications executable on electronic devices to meet the demand of diverse users and to raise the utility of electronic devices.

A camera application is among them, and the user may take a selfie or background using the camera of her electronic device. The electronic device may include a camera module for capturing images. The camera module may typically include a lens for collecting light, a photodiode for converting the collected light into an electrical signal, and an analog-to-digital converter (ADC) for converting the electrical signal, which is an analog signal, into a digital electrical signal. A process of a camera module that converts electrical signals from multiple photodiodes into digital electrical signals and outputs the digital electrical signals may be called 'read-out.'

SUMMARY

To address the above-discussed deficiencies, it is a primary object to provide a method and apparatus for detecting variations in image frames. High-speed photography-capable electronic devices rely on sufficient storage volume and power supply to enable high-speed photography and suffer from bulky size and limitation in use that they should be used in a fixed position.

Recently, vigorous research efforts are underway for portable electronic devices capable of high-speed photography. High-speed photography uses a memory capable of storing a number of image frames obtained for a short time, which imposes considerable limitations on portable electronic devices which may not be equipped with a sufficient capacity of memory. An alternative to address such limitations may be to detect the motion of an external object, a target for high-speed photography and begin to capture from the moment that the external object actually starts to move.

Due to limited storage and power consumption issues, portable electronic devices may still be limited in use for high speed photography or producing slow motion videos with images taken immediately before an event occurs and previously stored.

Various embodiments disclosed herein have been conceived to address such issues. According to an embodiment of the present disclosure, high speed photography can be achieved continuously multiple times using a portable electronic device including an image sensor. According to an embodiment of the present disclosure, a slow-motion video may be generated using images taken immediately before an event occurs.

According to an embodiment of the present disclosure, an electronic device may comprise an image sensor and one or more processors, wherein the one or more processors may be configured to receive a signal for photography, obtain a first plurality of image frames for an external object as per a first frame rate through the image sensor in response to the signal, detect a variation associated with the external object based on the first plurality of image frames, when the variation meets a designated condition, obtain a second plurality of image frames for the external object as per the first frame rate or a second frame rate and stop detecting the variation, generate a first portion of a video using at least some of the first plurality of image frames, generate a second portion of the video using at least some of the second plurality of image frames, and after stopping detecting the variation, based on a user input, generate a third portion of the video using at least some of a third plurality of image frames for the external object obtained as per the first frame rate or a third frame rate.

According to an embodiment of the present disclosure, an electronic device may comprise an image sensor including a memory and a first processor and a second processor provided outside the image sensor, wherein the first processor may be configured to receive a signal for video photography from the second processor, obtain a first plurality of image frames for an external object as per a first frame rate in response to the signal, store, in the memory, a designated number of first image frames among the first plurality of image frames, detect a variation associated with the external object based on at least some of the first plurality of image frames, and when the variation meets the designated condition, obtain a second plurality of image frames for the external object as per the first frame rate or a second frame rate and store the second plurality of image frames in the memory, and the second processor may be configured to generate a first portion of the video using second image frames among the first plurality of image frames, and generate a second portion of the video using, at least, at least some of the first image frames and at least some of the second plurality of image frames.

According to an embodiment of the present disclosure, an electronic device may comprise an image sensor including a memory and one or more processors, wherein the one or more processors may be configured to receive a signal for photography, obtain, through the image sensor, a first plurality of image frames for an external object as per a first frame rate in response to the signal, generate a first portion of a video using at least some of the first plurality of image frames, detect a variation associated with the external object based on the first plurality of image frames, when the variation meets a designated condition, stop generating the first portion, obtain, through the image sensor, a second plurality of image frames for the external object as per the first frame rate or a second frame rate, identify first information corresponding to a time when the variation meets the designated condition, store the second plurality of image frames in the memory and identify second information corresponding to a time when each of the second plurality of image frames is obtained, when a preset event occurs, obtain a third plurality of image frames for the external object as per the first frame rate and identify third information corresponding to a time when each of the third plurality of image frames is obtained, and generate a second portion and a third portion of the video based on, at least, the identified first information, second information, and third information.

According to an embodiment of the present disclosure, high speed photography can be performed continuously multiple times using a portable electronic device.

According to an embodiment of the present disclosure, a slow-motion video may be generated using a portable electronic device based on images taken immediately before an event occurs.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
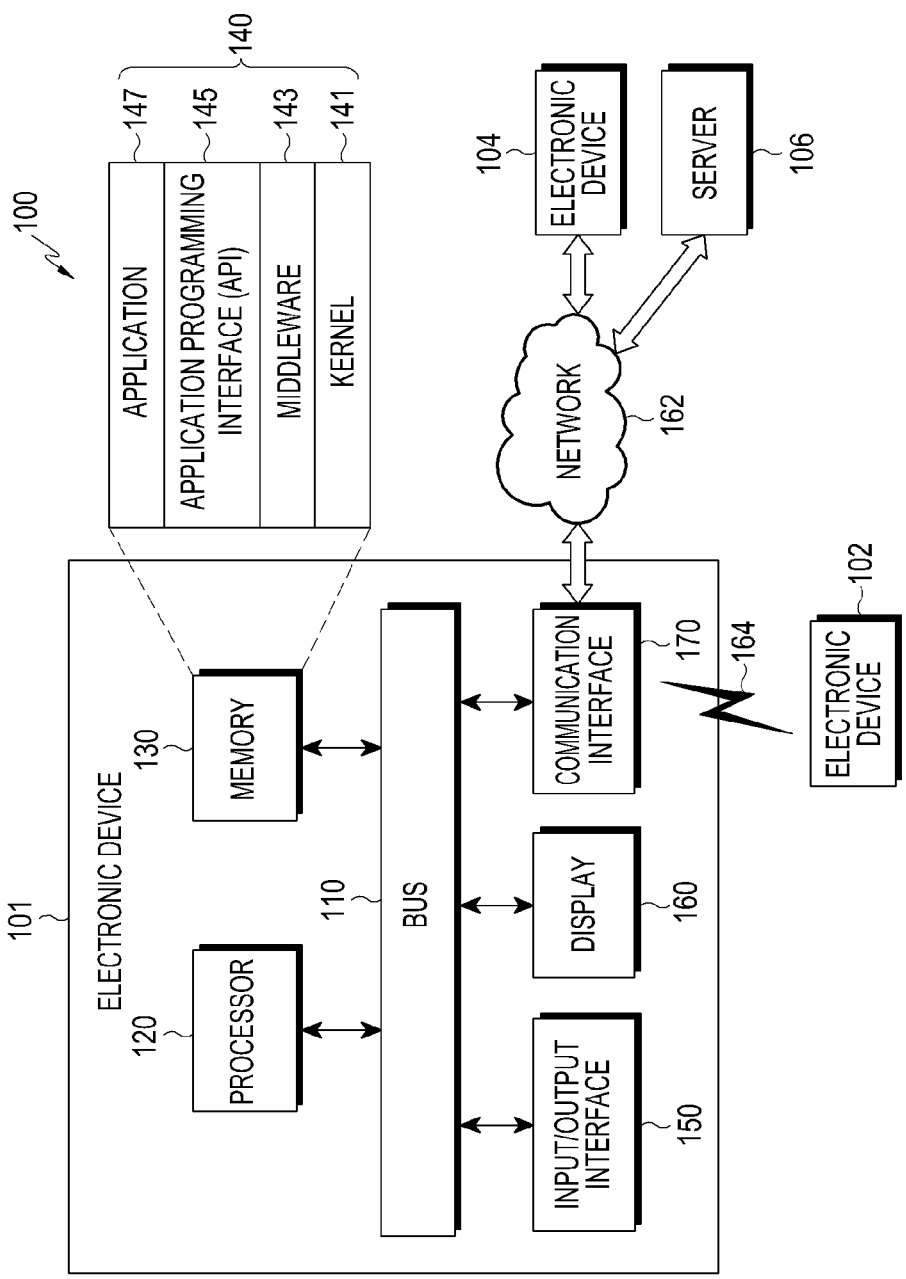
FIG. 1 illustrates a view of a network environment including an electronic device according to an embodiment of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device.

In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves).

According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, a communication interface 170, and a camera module 180. In some embodiments, the electronic device 101 may exclude at least one of the components or may add another component.

The bus 110 may include a circuit for connecting the components 110 to 180 with one another and transferring communications (e.g., control messages or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140.

The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources. The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control.

For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106). The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present disclosure, the wireless communication may include at least one of, e.g., wireless-fidelity (Wi-Fi), light-fidelity (Li-Fi), bluetooth, bluetooth low power (BLE), zigbee, near-field communication (NFC), magnetic secure transmission (MST), radio frequency (RF), or body area network (BAN) as denoted with denotation 164 of FIG. 1. According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The camera module 180 may include at least one image sensor. For example, the image sensor in the camera module 180 may convert light received from the outside into an electrical signal and output the electrical signal. The electrical signal may be output through the bus 110 to the processor 120 and processed by the processor 120 or stored in the memory 130. The camera module 180 may include a pixel array constituted of a plurality of pixels, and the pixel array may include a photodiode that converts light from the outside into an analog electrical signal. Meanwhile, the image sensor in the camera module 180 may include an analog-to-digital converter (ADC) that converts an analog electrical signal into a digital electrical signal and outputs the digital electrical signal. The image sensor in the camera module 180 may include a circuit for scanning the pixel array constituted of a plurality of pixels. The image sensor in the camera module 180 may include an internal memory. The image sensor may temporarily store a digital electrical signal, i.e., data output from a pixel, in the internal memory and output the digital electrical signal to an external circuit (e.g., the bus 110, the processor 120, or the memory 130). The image sensor in the camera module 180 may include an interface used for data input/output and output data to an external circuit according to the output speed of the interface.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
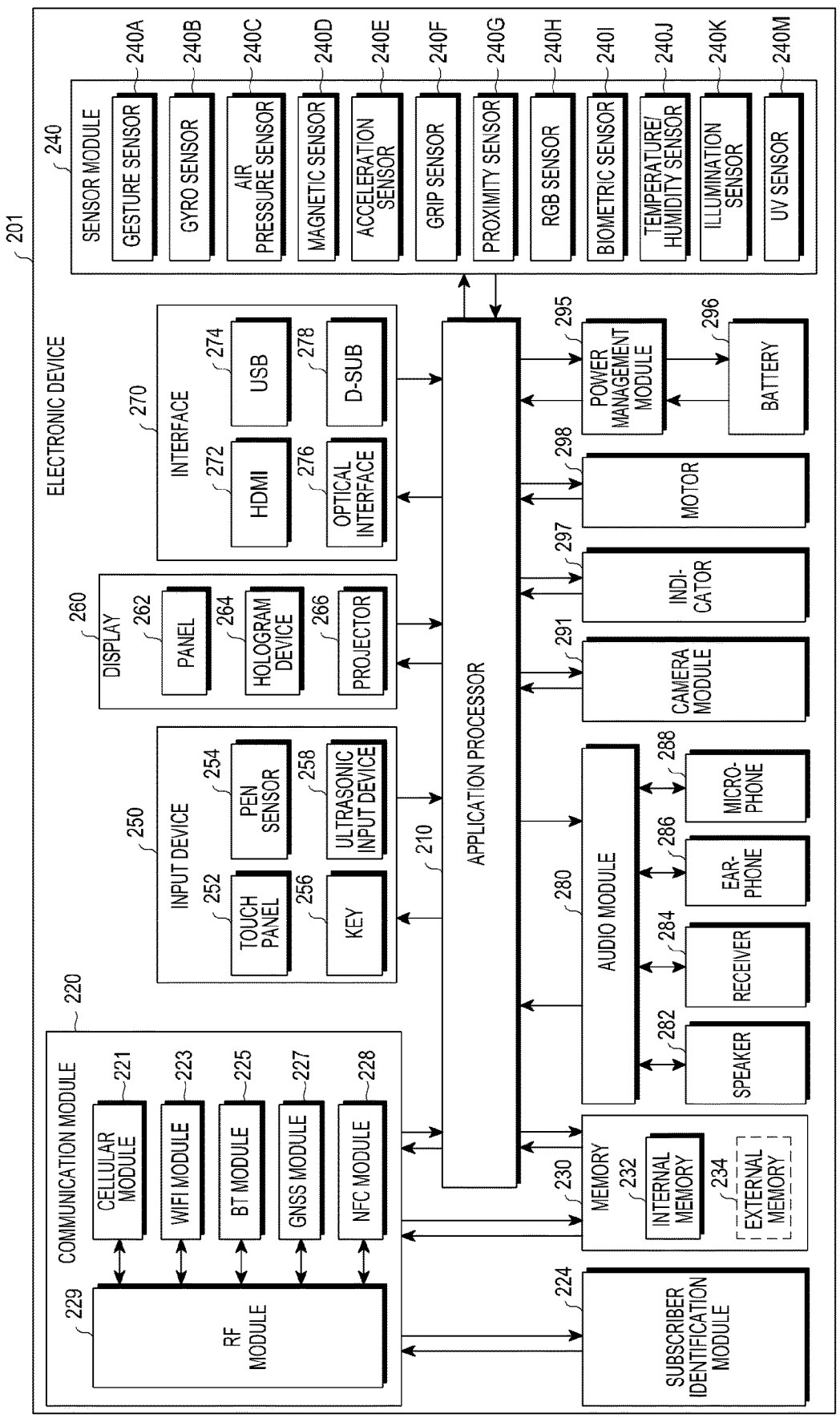
FIG. 2 illustrates a block diagram of an electronic device according to an embodiment of the present disclosure.

FIG. 2 illustrates a block diagram of an electronic device 201 according to an embodiment of the present disclosure. An electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a bluetooth (BT) module 225, a GNSS module 227, a NFC module 228, and a RF module 229. The cellular module 221 may provide voice call, video call, text, or Internet services through, e.g., a communication network. According to an embodiment of the present disclosure, the cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer to provide an immediate reaction to the user. The (digital) pen sensor 254 may include, e.g., part of the touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. According to an embodiment of the present disclosure, the camera module 291 may include the whole or part of the camera module 180.

The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

According to an embodiment of the present disclosure, an electronic device may comprise an image sensor and one or more processors, wherein the one or more processors may be configured to receive a signal for photography, obtain a first plurality of image frames for an external object as per a first frame rate through the image sensor in response to the signal, detect a variation associated with the external object based on the first plurality of image frames, when the variation meets a designated condition, obtain a second plurality of image frames for the external object as per the first frame rate or a second frame rate and stop detecting the variation, generate a first portion of a video using at least some of the first plurality of image frames, generate a second portion of the video using at least some of the second plurality of image frames, and after stopping detecting the variation, based on a user input, generate a third portion of the video using at least some of a third plurality of image frames for the external object obtained as per the first frame rate or a third frame rate.

According to an embodiment of the present disclosure, the one or more processors may include a first processor and a second processor. The first processor may be included in the image sensor. The second processor may be provided outside the image sensor. The first processor may be configured to receive the signal for photography from the second processor, obtain the first plurality of image frames for the external object as per the first frame rate in response to the signal, detect the variation associated with the external object based on the first plurality of image frames, and when the variation meets the designated condition, obtain the second plurality of image frames for the external object as per the first frame rate or the second frame rate and stop detecting the variation. The second processor may be configured to generate the first portion of the video using at least some of the first plurality of image frames, generate the second portion of the video using at least some of the second plurality of image frames, and after stopping detecting the variation, based on a user input, generate the third portion of the video using the at least some of the third plurality of image frames for the external object obtained as per the first frame rate or the third frame rate through the first processor.

According to an embodiment of the present disclosure, the image sensor may further include a memory. The one or more processors may be configured to store, in the memory, a designated number of first image frames among the first plurality of image frames, and when the variation meets the designated condition, generate the second portion of the video using, at least, at least some of the second plurality of image frames and at least some of the first image frames stored in the memory.

According to an embodiment of the present disclosure, the one or more processors may be configured to select, as per a first ratio, the designated number of first image frames among the first plurality of image frames and store the selected first image frames in the memory, and select, as per a second ratio, a second image frames among the first plurality of image frames and generate the first portion of the video using the selected second image frames.

According to an embodiment of the present disclosure, the one or more processors may be configured to, when the variation meets the designated condition, stop generating the first portion of the video, obtain first information corresponding to a time when the generation of the first portion is stopped and second information corresponding to a time when each of the second plurality of image frames is obtained, and generate the second portion of the video based on the first information and the second information.

According to an embodiment of the present disclosure, the one or more processors may be configured to receive information about a region of interest (ROI) corresponding to at least part of the external object, identify the ROI from at least some of the first plurality of image frames based on the information, and detect the variation associated with the external object based on the identified ROI.

According to an embodiment of the present disclosure, the one or more processors may be configured to detect the variation associated with the external object based on image frames obtained after a preset time elapses from the time when the signal for photography is received among the first plurality of image frames.

According to an embodiment of the present disclosure, the electronic device may further comprise a display. The one or more processors may be configured to control the display to display some of the first plurality of image frames, the second plurality of image frames, and the third plurality of image frames, as per a fourth frame rate lower than the first frame rate. Controlling the display may include controlling the display to display content related to frame rates at which the first plurality of image frames, the second plurality of image frames, and the third plurality of image frames are obtained.

According to an embodiment of the present disclosure, an electronic device may comprise an image sensor including a memory and a first processor and a second processor provided outside the image sensor, wherein the first processor may be configured to receive a signal for video photography from the second processor, obtain a first plurality of image frames for an external object as per a first frame rate in response to the signal, store, in the memory, a designated number of first image frames among the first plurality of image frames, detect a variation associated with the external object based on at least some of the first plurality of image frames, and when the variation meets the designated condition, obtain a second plurality of image frames for the external object as per the first frame rate or a second frame rate and store the second plurality of image frames in the memory, and the second processor may be configured to generate a first portion of the video using second image frames among the first plurality of image frames, and generate a second portion of the video using, at least, at least some of the first image frames and at least some of the second plurality of image frames.

According to an embodiment of the present disclosure, the first processor may be configured to, when the variation meets the designated condition, stop detecting the variation. The second processor may be configured to, after stopping detecting the variation, based on a user input, generate a third portion of the video using at least some of a third plurality of image frames for the external object obtained as per the first frame rate or a third frame rate through the first processor.

According to an embodiment of the present disclosure, the first processor may be configured to select, as per a first ratio, the designated number of first image frames among the first plurality of image frames and store the selected first image frames in the memory, and to select, as per a second ratio, the second image frames among the first plurality of image frames and transmit the selected second image frames to the second processor.

According to an embodiment of the present disclosure, the second processor may be configured to, when the variation meets the designated condition, stop generating the first portion of the video, obtain first information corresponding to a time when the generation of the first portion is stopped and second information corresponding to a time when each of the second plurality of image frames is obtained, and generate the second portion of the video based on the first information and the second information.

According to an embodiment of the present disclosure, the first processor may be configured to receive information about a region of interest (ROI) corresponding to at least part of the external object, identify the ROI from at least one of the first plurality of image frames and the second plurality of image frames based on the information, and detect the variation associated with the external object based on the identified ROI.

According to an embodiment of the present disclosure, the first processor may be configured to detect the variation associated with the external object based on image frames obtained after a preset time elapses from the time when the signal related to the video photography is received among the first plurality of image frames.

According to an embodiment of the present disclosure, the electronic device may further comprise a display. The first processor may be configured to control the display to display some of the first plurality of image frames and the second plurality of image frames, as per a fourth frame rate lower than the first frame rate. Controlling the display may include controlling the display to display content related to frame rates at which the first plurality of image frames and the second plurality of image frames are obtained.

According to an embodiment of the present disclosure, an electronic device may comprise an image sensor including a memory and one or more processors, wherein the one or more processors may be configured to receive a signal for photography, obtain, through the image sensor, a first plurality of image frames for an external object as per a first frame rate in response to the signal, generate a first portion of a video using at least some of the first plurality of image frames, detect a variation associated with the external object based on the first plurality of image frames, when the variation meets a designated condition, stop generating the first portion, obtain, through the image sensor, a second plurality of image frames for the external object as per the first frame rate or a second frame rate, identify first information corresponding to a time when the variation meets the designated condition, store the second plurality of image frames in the memory and identify second information corresponding to a time when each of the second plurality of image frames is obtained, when a preset event occurs, obtain a third plurality of image frames for the external object as per the first frame rate and identify third information corresponding to a time when each of the third plurality of image frames is obtained, and generate a second portion and a third portion of the video based on, at least, the identified first information, second information, and third information.

According to an embodiment of the present disclosure, the first portion of the video may be generated using at least some of the first plurality of image frames, the second portion of the video may be generated using at least some of the second plurality of image frames, and the third portion of the video may be generated using at least some of the third plurality of image frames.

According to an embodiment of the present disclosure, the one or more processors may be configured to stop generating the first portion of the video based on a signal corresponding to a time when the variation meets the designated condition.

According to an embodiment of the present disclosure, the one or more processors may be configured to generate the second portion and the third portion of the video upon receiving, from the image sensor, an image frame including the second information among the second plurality of image frames.

Figure 3:
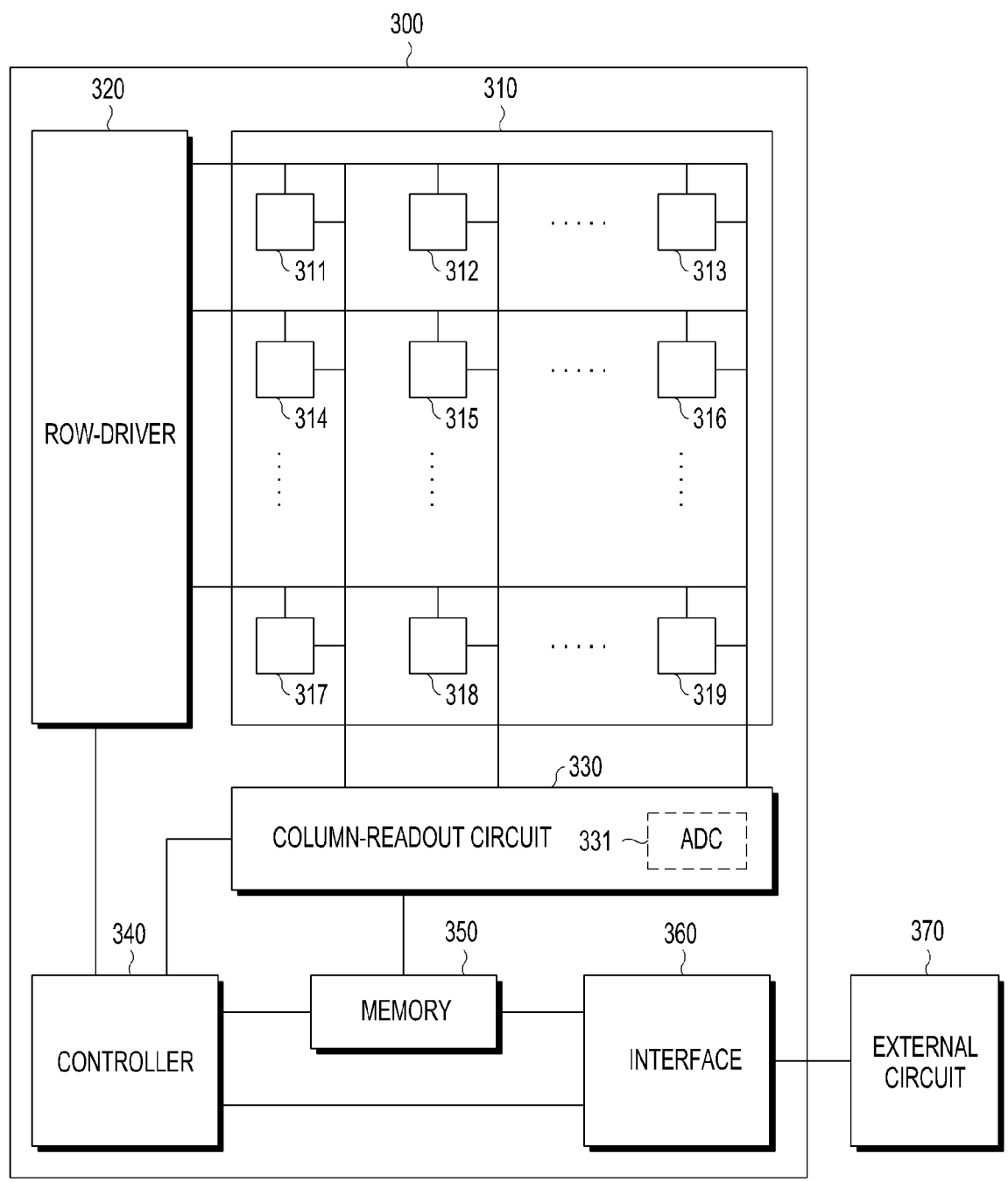
FIG. 3 illustrates a block diagram of a structure of an image sensor according to an embodiment of the present disclosure.

FIG. 3 illustrates a block diagram of a structure of an image sensor according to an embodiment of the present disclosure.

According to an embodiment of the present disclosure, an image sensor 300 may be a component of a camera module (e.g., 180 or 291) in an electronic device (e.g., 101 or 201).

Referring to FIG. 3, the image sensor 300 may include at least one of a pixel array 310, a row-driver 320, a column-readout circuit 330, a controller 340, a memory 350, and an interface 360.

The pixel array 310 may include a plurality of pixels 311 to 319. For example, the pixel array 310 may have a structure in which the plurality of pixels 311 to 319 are arrayed in an M×N matrix pattern (where M and N are positive integers). The pixel array 310 where the plurality of pixels 311 to 319 are arrayed in a two-dimensional (2D) M×N pattern may have M rows and N columns. The pixel array 310 may include a plurality of photosensitive elements, e.g., photodiodes or pinned photodiodes. The pixel array 310 may detect light using the plurality of photosensitive elements and convert the light into an analog electrical signal to generate an image signal.

The row-driver 320 may drive the pixel array 310 for each row. For example, the row-driver 320 may output transmission control signals to the transmission transistors of the plurality of pixels 311 to 319 in the pixel array 310, reset control signals to control reset transistors, or selection control signals to control selection transistors to the pixel array 310. The row-driver 320 may determine a row to be read out.

The column-readout circuit 330 may receive analog electrical signals generated by the pixel array 310. For example, the column-readout circuit 330 may receive an analog electrical signal from a column line selected among the plurality of columns constituting the pixel array 310. The column-readout circuit 330 may include an analog-digital converter (ADC) 331 that may convert the analog electrical signal received from the selected column line into pixel data (or a digital signal) and output the pixel data. Meanwhile, the column-readout circuit 330 receiving an analog electrical signal from the pixel array 310, converting the received analog electrical signal into pixel data using the ADC 331, and outputting the pixel data may be referred to as read-out. The column-readout circuit 330 and the ADC 331 may determine a column to be read out.

According to an embodiment of the present disclosure, the column-readout circuit 330 of the image sensor 300 supportive of high speed photography may include a plurality of ADCs 331. Each of the plurality of ADCs 331 may be connected in parallel with a respective one of the plurality of photodiodes in the pixel array 310, and analog electrical signals simultaneously received from the plurality of photodiodes may quickly be converted into pixel data based on the parallel structure. The column-readout circuit 330 of the image sensor 300 supportive of high speed photography may perform a read-out at a high frame rate (e.g., 960 frames per second (fps)). For example, reading out at 960 fps means that receiving an analog electrical signal from the pixel array 310, converting the received analog electrical signal into pixel data using the ADC 331, and outputting the pixel data are performed once per $1/960$ seconds. In other words, reading out at 960 fps may mean that 960 image frames are outputted per second.

The controller 340 may obtain an image frame based on the pixel data received from the column-readout circuit 330. The controller 340 may output the image frame through the interface 360 to an external circuit 370. According to an embodiment of the present disclosure, the controller 340 may generate transmission control signals to control the transmission transistors of the plurality of pixels 311 to 319, reset control signals to control reset transistors, or selection control signals to control selection transistors and provide the generated signals to the row-driver 320. The controller 340 may generate a selection control signal to select at least one column line among the plurality of column lines constituting the pixel array 310 and provide the generated signal to the column-readout circuit 330. For example, the column-readout circuit 330 may enable some of the plurality of column lines and disable the other column lines based on selection control signals provided from the controller 340. The controller 340 may be implemented in a processor (e.g., 120 or 210) including a central processing unit (CPU) or application processor (AP), a sort of block or module. When the controller 340 is implemented as a block, the controller 340 may include a subtractor for detecting a difference between, e.g., images, or a comparator for comparing images. According to an embodiment of the present disclosure, the controller 340 may downsize read-out images and compare the plurality of downsized images to detect differences between the images.

The memory 350 may include a volatile and/or non-volatile memory. The memory 350 is a storage device inside the image sensor 300. The memory 350 may include a buffer memory. According to an embodiment of the present disclosure, the memory 350 may temporarily store digital signals output from the column-readout circuit 330 or the controller 340. For example, the memory 350 may include at least one image frame obtained based on light received by the pixel array 310. The memory 350 may store at least one digital signal received from the external circuit 370 through the interface 360.

According to an embodiment of the present disclosure, the memory 350 may store at least one image frame read out at an nth frame rate (e.g., 960 fps) from the column-readout circuit 330 and deliver at least one image frame stored through the interface 360 to the external circuit 370 at an Mth frame rate (e.g., 120 fps). In other words, the memory 350 may store at least one image frame read out once per $1/960$ seconds from the column-readout circuit 330, and the memory 350 may deliver at least one image frame stored through the interface 360 to the external circuit 370 once per $1/120$ seconds.

Meanwhile, the controller 340 may store only some of N image frames read out through the column-readout circuit 330 at the Nth frame rate (e.g., 960 fps) in the memory 350, allowing for substantially the same effect as if M image frames are obtained which are read out at the Mth frame rate (e.g., 120 fps). For example, the controller 340 may store only one of eight image frames read out at 960 fps for $8/960$ seconds in the memory 350. Where among a plurality of image frames read out at 960 fps, only image frames selected in the ratio of 1:8 are stored in the memory 350, the image frames stored in the memory 350 may be substantially the same image frames as those read out at 120 fps through the column-readout circuit 330. For example, where a video constituted of only image frames obtained at the cycle of $1/120$ seconds is defined as '120 fps video,' a video constituted of only image frames selected in the ratio of 1:8 among the plurality of image frames read out at 960 fps may be defined as a 120 fps video. A video constituted of only image frames read out at 120 fps through the column-readout circuit 330 may also be defined as a 120 fps video.

The interface 360 may include, e.g., the input/output interface 150 or the communication interface 170. The interface 360 may connect components of the image sensor 300, e.g., the controller 340 or the memory 350, with the external circuit 370 in a wireless or wired scheme. For example, the interface 360 may deliver at least one image frame stored in the memory 350 of the image sensor 300 to the external circuit 370, e.g., the memory (e.g., 130 or 230) of the electronic device (e.g., 101 or 201). The interface 360 may also deliver control signals from the processor (e.g., 120 or 210) of the electronic device (e.g., 101 or 201) to the controller 340 of the image sensor 300.

According to an embodiment of the present disclosure, the image sensor 300 may communicate with the external circuit 370 through the interface 360, e.g., in a serial communication scheme. For example, the memory 350 of the image sensor 300 may communicate with the processor (e.g., 120 or 210) of the electronic device (e.g., 101 or 201) in an inter-integrated circuit ($I^2C$) scheme.

According to an embodiment of the present disclosure, the image sensor 300 may connect with the external circuit 370 through the interface 360, e.g., an interface as defined as per the mobile industry processor interface (MIPI) protocol. For example, the memory 350 of the image sensor 300 may communicate with the processor (e.g., 120 or 210) of the electronic device (e.g., 101 or 201) as per the interface defined in the MIPI protocol. The interface 360, e.g., the interface defined as per the MIPI protocol, may deliver pixel data corresponding to the image frames stored in the memory 350 to the external circuit 370 at the cycle of 1/120 seconds.

According to an embodiment of the present disclosure, the output speed of the interface 360 may be an Lth frame rate (e.g., 240 fps) which is different from the read-out speed, i.e., the Nth frame rate (e.g., 960 fps) or Mth frame rate (e.g., 120 fps). For example, where the output speed of the interface 360 is 240 fps, the controller 340 may transmit one image frame used in generating a video during 0~1/240 seconds, and one image frame displayed on the display as a preview image during 1/240~2/240 seconds. In other words, the controller 340 may alternately send image frames used for generating a video and image frames used as preview images through the interface 360, which has an output speed of 240 fps, to the external circuit 370 every 1/240 seconds. In this case, the speed at which each of the image frame used for generating a video and the image frame used as a preview image is transmitted to the external circuit 370 may be 120 fps. For example, this is why image frames used to generate a video are delivered to the external circuit 370 once per 1/120 seconds.

After storing only image frames selected in the ratio of 1:8 among the plurality of image frames read out at 960 fps in the memory 350, the controller 340 may deliver the image frames stored in the memory 350 through the interface 360, which has an output speed of 240 fps, to the external circuit 370 once per 1/120 seconds. In this case, the processor 120 in the external circuit 370 may generate a 120 fps video using the delivered image frames. After storing all of the plurality of image frames read out at 960 fps in the memory 350, the controller 340 may deliver the image frames stored in the memory 350 through the interface 360, which has an output speed of 240 fps, to the external circuit 370 once per 1/120 seconds. In this case, the processor 120 in the external circuit 370 may generate a 960 fps video using the delivered image frames.

Meanwhile, while the image frames stored in the memory 350 are delivered through the interface 360 having an output speed of 240 fps to the external circuit 370 once per 1/120 seconds, at least some of the image frames read out in real-time through the column-readout circuit 330 may be delivered to the external circuit 370 as preview images once per 1/120 seconds. The processor 120 in the external circuit 370 may display, through the display, all or some of the image frames output as preview images from the image sensor 300 at 30 fps or 60 fps.

All or some of the above-described components 310 to 360 may be included in the image sensor 300 as necessary, and the number of each component may be one or more. The frame rates 120 fps, 240 fps, and 960 fps, used in the above embodiments may be varied depending on the settings of the electronic device or the performance of the interface.

Figure 4:
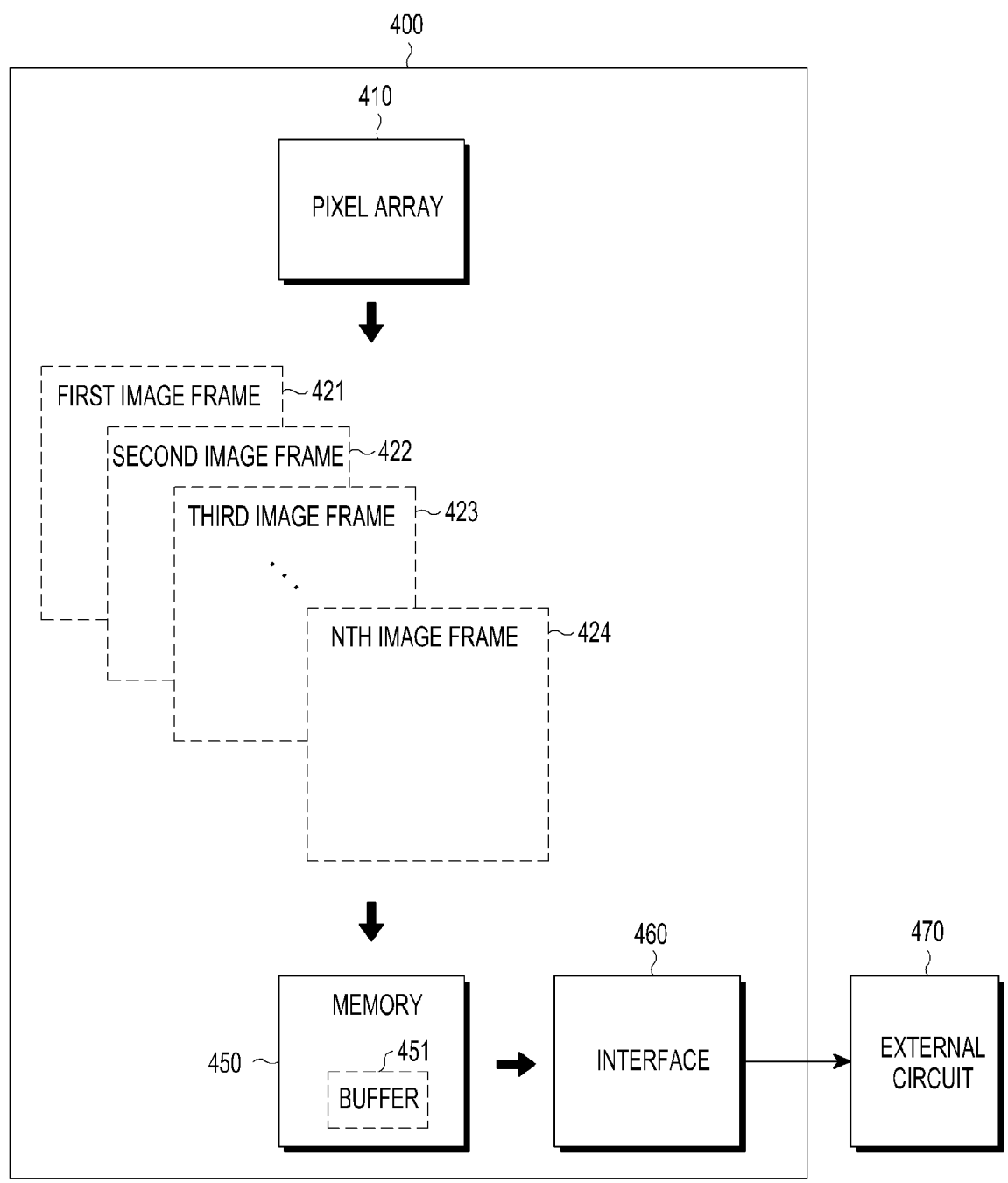
FIG. 4 illustrates a block diagram of a process for obtaining an image frame through an image sensor according to an embodiment of the present disclosure.

FIG. 4 illustrates a block diagram of a process for obtaining an image frame through an image sensor according to an embodiment of the present disclosure. An image sensor 400 may be a component of a camera module (e.g., 180 or 291) in an electronic device (e.g., 101 or 201).

Referring to FIG. 4, the image sensor 400 may include at least one a pixel array 410, a memory 450, and an interface 460. The image sensor 400 may include the whole or part of the image sensor 300 of FIG. 3.

The pixel array 410 of the image sensor 400 may output an electrical signal corresponding to light received from the outside. For example, the pixel array 410 may include a plurality of pixels constituted of photodiodes. The photodiodes may receive light and generate analog electrical signals corresponding to the received light. Analog electrical signals generated from the plurality of photodiodes constituting the plurality of pixels may be converted into a plurality of pieces of pixel data through a column-readout circuit (e.g., 330). In this case, each piece of pixel data may mean a pixel value corresponding to its respective pixel. A set of a plurality of pieces of pixel data obtained at a particular time may constitute at least one image frame.

According to an embodiment of the present disclosure, the pixel array 410 of the image sensor 400 may output a plurality of image frames 421 to 424 at a preset read-out speed. For example, where the read-out speed is set as 960 fps, the image sensor 400 may read-out 960 image frames per second based on light received by the pixel array 410.

The plurality of image frames 421 to 424 read out may be stored in a memory 450 inside the image sensor 400. According to an embodiment of the present disclosure, the memory 450 of the image sensor 400 may include a buffer memory 451. For example, some of the plurality of image frames 421 to 424 read out at 960 fps may be stored in the buffer memory 451. Among a plurality of image frames continuously read out, a designated number of image frames may be stored in the buffer memory 451. The processor (e.g., 120, 210, or the controller 340) may repeat the operations of deleting the image frame stored earliest among the image frames stored in the buffer memory 451 and storing the image frame latest among the image frames.

At least one image frame stored in the memory 450 of the image sensor 400 may be delivered to an external circuit 470 through an interface 460 (e.g., 360). For example, the processor (e.g., 120, 210, or the controller 340) may control the interface 460 to deliver at least one image frame stored in the memory 450 to the external circuit 470.

Figure 5:
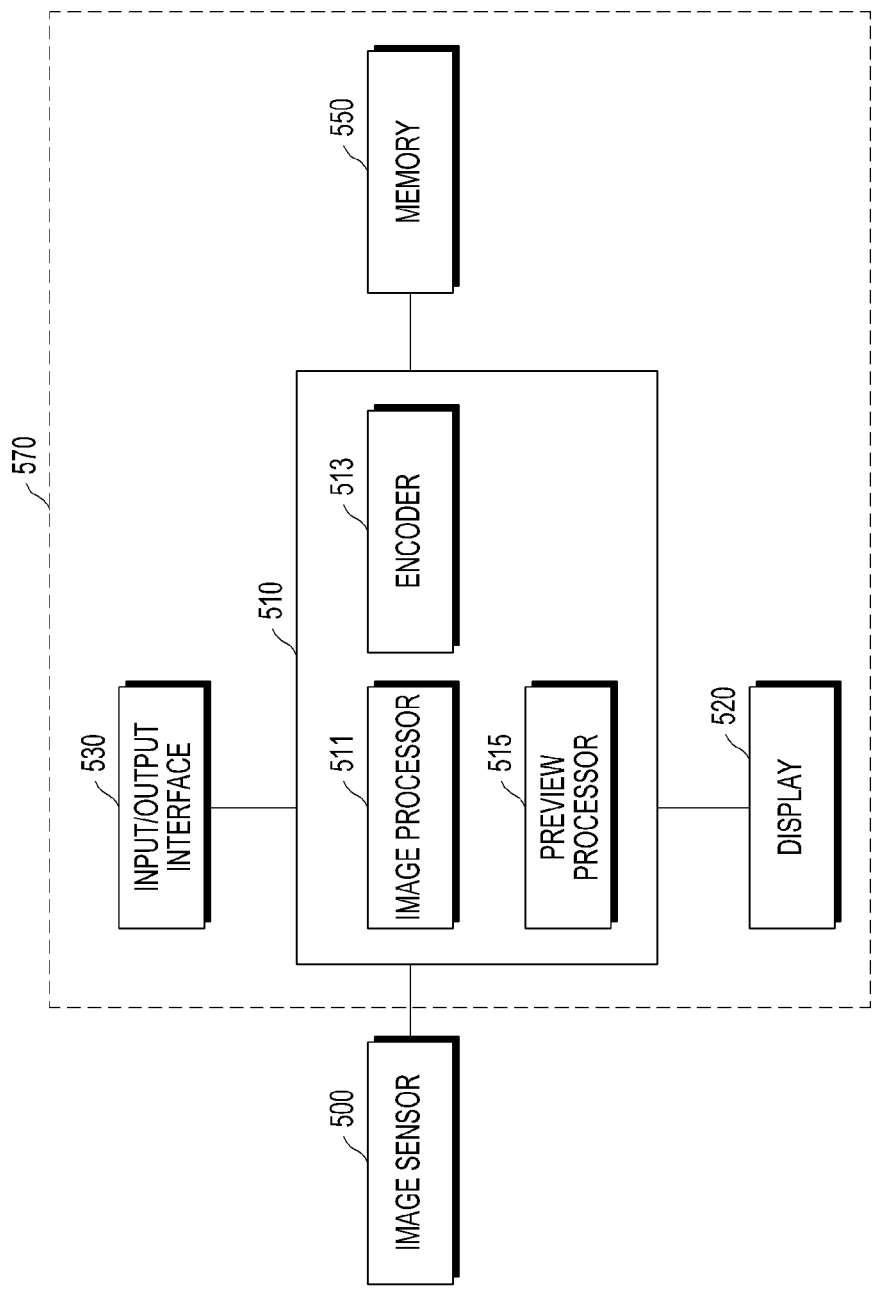
FIG. 5 illustrates a block diagram of components of an electronic device according to an embodiment of the present disclosure.

FIG. 5 illustrates a block diagram of components of an electronic device (e.g., 101 or 201) according to an embodiment of the present disclosure. An image sensor 500 may be a component of a camera module (e.g., 180 or 291) in an electronic device. The image sensor 500 may include the whole or part of the image sensor 300 of FIG. 3.

According to an embodiment of the present disclosure, the electronic device may include an image sensor 500 and an external circuit 570 connected with the image sensor. For example, the external circuit 570 may include at least one of a processor 510 (e.g., 120 or 210), a display 520 (e.g., 160), an input/output interface 530 (e.g., 150), and a memory 550 (e.g., 130).

According to an embodiment of the present disclosure, the processor 510 may include at least one of an image processor 511, an encoder 513, and a preview processor 515. Meanwhile, at least any one of the components 511, 513, and 515 in the processor 510 may be designed in hardware, software, firmware, or in other various forms, and each component may be termed with a different name.

For example, the image processor 511 may receive at least one piece of pixel data output from the image sensor 500 and process or edit the received pixel data for delivery to at least one component of the electronic device.

The encoder 513 may generate at least one video based on the pixel data processed by the image processor 511. For example, the encoder 513 may compress an image frame corresponding to the pixel data received from the image sensor 500 to be stored in the memory 550. Further, the encoder 513 may encode image frames corresponding to a plurality of pieces of pixel data received from the image sensor 500. The encoder 513 may array the plurality of image frames in the order obtained through the image sensor 500 based on the plurality of pieces of pixel data received from the image sensor 500. The processor 510 may store the video encoded by the encoder 513 in the memory 550.

The preview processor 515 may resize the image frame corresponding to the pixel data received from the image sensor 500 to be displayed through the display 520. "Preview image" means an image that is displayed on the display 520 when the user takes an image of at least one object using the camera module (e.g., 180) of the electronic device. At least one image frame obtained through the image sensor 500 may be displayed in real-time on the display 520 as a preview image, and the user of the electronic device may easily take images of the external object through the preview image.

The display 520 may display at least one image frame obtained through the image sensor 500. For example, the display 520 may display the preview image generated through the preview processor 515 or at least one video stored in the memory 550.

For example, the input/output interface 530 may transfer commands or data input from the user or other external device to other component(s) of the electronic device or may output commands or data received from other component(s) of the electronic device to the user or other external devices.

The memory 550 may store at least one image frame obtained through the image sensor 500 or at least one video encoded through the encoder 513. Meanwhile, the image sensor 500 may include at least one memory (e.g., 350) in which case the memory 550 may mean a different storage space positioned in a place separated from the memory 350.

Figure 6:
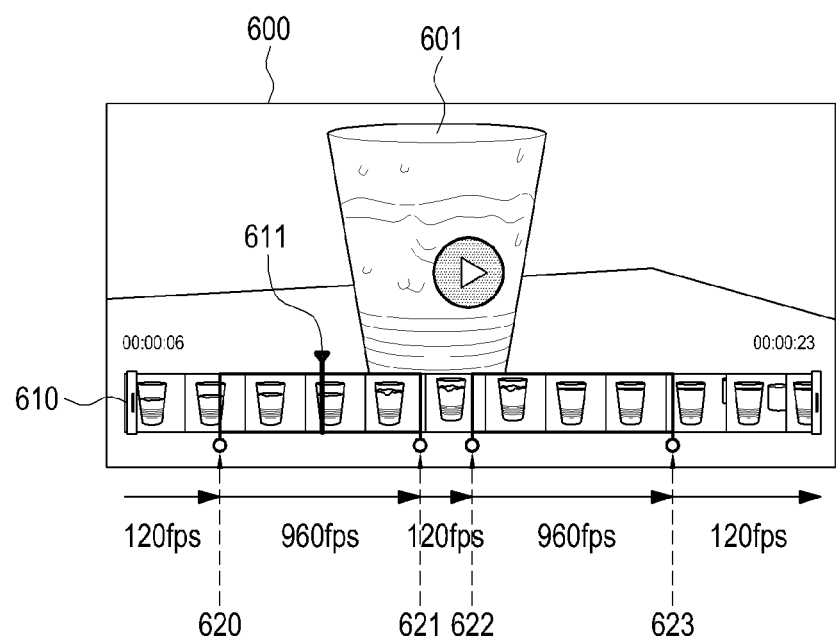
FIG. 6 illustrates a view of a method for performing high speed photography using an electronic device according to an embodiment of the present disclosure.

FIG. 6 illustrates a view of a method for performing high speed photography using an electronic device according to an embodiment of the present disclosure. According to an embodiment of the present disclosure, an electronic device may include an image sensor (e.g., 300), a processor (e.g., 120 or 210), and a display (e.g., 160). Here, the image sensor may include at least one of a pixel array 310, a row-driver 320, a column-readout circuit 330, a controller 340, a memory 350, and an interface 360.

Referring to FIG. 6, the processor may obtain a plurality of image frames for an external object 601 through the image sensor and generate a video 600 using at least some of the obtained image frames. The video 600 may be configured as a 120 fps video or 960 fps video depending on the time when each of the image frames constituting the video is obtained and the read-out speed of the image sensor. Here, the 120 fps video means that the image frames constituting the video are obtained at the cycle of $1/120$ seconds, and the 960 fps video means that the image frames constituting the video are obtained at the cycle of $1/960$ seconds. The video 600 may include content 611 indicating the current position of playback through the display.

According to an embodiment of the present disclosure, the controller 340 included in the image sensor may set the read-out speed, which is the output speed of the column-readout circuit 330, as 120 fps corresponding to a request related to execution of a high speed photography mode. Where the read-out speed is set as 120 fps, the image sensor may read-out 120 image frames per second based on light received by the pixel array 310.

The controller 340 may detect a variation associated with the external object using at least two of the plurality of image frames read out. For example, the controller 340 may detect a variation associated with the external object 601 based on at least two of the plurality of image frames read out through the column-readout circuit 330 before a first time 620. For example, variations associated with the external object which can be detected through the controller 340 may include a variation based on a difference in brightness between the two image frames or a variation based on a movement of the external object commonly included in the two image frames. The controller 340 may select a first image frame and a second image frame among the plurality of image frames obtained through the column-readout circuit 330 before the first time 620. Where a difference between a first brightness of the selected first image frame and a second brightness of the selected second image frame exceeds a preset threshold, the processor may determine that the variation associated with the external object 601 has occurred between the time when the first image frame was obtained and the time when the second image frame was obtained. In this case, the controller 340 may set the time when the second image frame was obtained as the first time 620, and the controller 340 may begin automatic high speed photography from the first time 620.

Meanwhile, the controller 340 may deliver, through the interface 360 to the external circuit 370, a first plurality of image frames read out at 120 fps from the column-readout circuit 330 before the first time 620. For example, when the output speed of the interface 360 is 240 fps, the controller 340 may deliver, in real-time, the first plurality of image frames, which are read out at 120 fps, to the external circuit 370 without storing the image frames in the memory 350. Since the interface with an output speed of 240 fps may deliver one image frame per $1/240$ seconds, the controller 340 may deliver image frames used to generate a 120 fps video once per $1/120$ seconds (e.g., 0 sec, $2/240$ sec, $4/240$ sec, ... ) while simultaneously delivering preview images once per $1/120$ seconds (e.g., $1/240$ sec, $3/240$ sec, $5/240$ sec, ... ). The processor in the external circuit 370 may generate a 120 fps video using the first plurality of image frames output through the interface of the image sensor. The processor in the external circuit 370 may provide a preview using the plurality of image frames output through the interface of the image sensor.

According to an embodiment of the present disclosure, the controller 340 may raise the read-out speed of the column-readout circuit 330 to, e.g., 960 fps to perform automatic high speed photography from the first time 620 when a variation associated with the external object is detected. When the read-out speed rises from 120 fps to 960 fps, the number of image frames obtained increases from 120 per second to 960 per second, and thus, the variation associated with the external object may precisely be observed. The controller 340 may deliver, through the interface 360 to the external circuit 370, a second plurality of image frames read out at 960 fps from the column-readout circuit 330 immediately after the first time 620. For example, when the output speed of the interface 360 is 960 fps, the controller 340 may deliver, in real-time, the second plurality of image frames, which are read out at 960 fps, to the external circuit 370 without storing the image frames in the memory 350.

Meanwhile, when the output speed of the interface 360 is lower than 960 fps, the controller 340 may store the second plurality of image frames read out at 960 fps in the memory 350 and may then deliver the second plurality of image frames stored in the memory to the external circuit 370 depending on the output speed. For example, the controller 340 may store all of the second plurality of image frames read out at 960 fps in the memory 350. The controller 340 may deliver the second plurality of image frames stored through the interface 360 to the external circuit 370. For example, when the output speed of the interface 360 is 240 fps, the controller 340 may output a preview image at 120 fps while simultaneously outputting, at 120 fps, the second plurality of image frames stored in the memory 350. The processor in the external circuit 370 may generate a 960 fps video using the second plurality of image frames output through the interface of the image sensor. The controller 340 may store the second plurality of image frames read out at 960 fps in the memory 350 while simultaneously outputting the second plurality of image frames stored in the memory 350 through the interface 360 at 120 fps. Alternatively, the controller 340 may output the second plurality of image frames stored in the memory 350 through the interface 360 at 120 fps from the moment that the storage of the memory 350 is full of the second plurality of image frames read out at 960 fps.

According to an embodiment of the present disclosure, where the storage of the memory 350 is filled up at a second time 621, the controller 340 may pause automatic high speed photography. The controller 340 may lower the read-out speed of the column-readout circuit 330 corresponding to pausing automatic high speed photography. For example, the controller 340 may lower the read-out speed from 960 fps to 120 fps to deliver the read-out image frames, in real-time, to the external circuit 370 without storing the image frames in the memory 350. The column-readout circuit 330 may read-out a third plurality of image frames at 120 fps from the second time 621.

Meanwhile, the controller 340 may store the second plurality of image frames read out at 960 fps from the first time 620 until the storage of the memory 350 is filled up, and the controller 340 may output the second plurality of image frames stored in the memory 350 from the second time 621 when the storage of the memory 350 is filled up. For example, when the output speed of the interface 360 is 240 fps, the controller 340 may output the second plurality of image frames stored in the memory 350 at 120 fps while simultaneously outputting, at 120 fps, a third plurality of image frames read out in real-time. The processor in the external circuit 370 may generate a 960 fps video using the second plurality of image frames output through the interface of the image sensor. The processor in the external circuit 370 may generate a 120 fps video using the third plurality of image frames output through the interface of the image sensor.

According to an embodiment of the present disclosure, the controller 340 may receive a signal related to starting manual high speed photography from the user at a third time 622. The controller 340 may raise the read-out speed of the column-readout circuit 330 to 960 fpls corresponding to the received signal related to starting manual high speed photography. The column-readout circuit 330 may read-out a fourth plurality of image frames at 960 fps from the third time 622. The processor in the external circuit 370 may generate a 960 fps video using the fourth plurality of image frames output through the interface of the image sensor.

According to an embodiment of the present disclosure, where the storage of the memory 350 is filled up at a fourth time 623, the controller 340 may pause manual high speed photography. The controller 340 may lower the read-out speed of the column-readout circuit 330 corresponding to pausing manual high speed photography. For example, the controller 340 may lower the read-out speed from 960 fps to 120 fps to deliver the read-out image frames, in real-time, to the external circuit 370 without storing the image frames in the memory 350. The column-readout circuit 330 may read-out a fifth plurality of image frames at 120 fps from the fourth time 623. The processor in the external circuit 370 may generate a 120 fps video using the fifth plurality of image frames output through the interface of the image sensor.

According to an embodiment of the present disclosure, the controller 340 included in the image sensor may set the read-out speed, which is the output speed of the column-readout circuit 330, as 960 fps corresponding to a request related to execution of a high speed photography mode. Where the read-out speed is set as 960 fps, the image sensor may read-out 960 image frames per second based on light received by the pixel array 310.

Meanwhile, the controller 340 may select some of the plurality of image frames read out at 960 fps in the ratio of 1:8. In other words, the controller 340 may store one out of every eight read-out image frames in the memory 350. The controller 340 may deliver the image frames stored in the memory 350 to the external circuit 370, and the processor in the external circuit 370 may generate a 120 fps video using the delivered image frames.

Or, the controller 340 may store all of the plurality of image frames read out at 960 fps in the memory 350. The controller 340 may deliver the image frames stored in the memory 350 to the external circuit 370, and the processor in the external circuit 370 may generate a 960 fps video using the delivered image frames.

In the above embodiments, the 960 fps video obtained between the first time 620 and the second time 621 is described as an outcome of automatic high speed photography, and the 960 fps obtained between the third time 622 and the fourth time 623 is described as an outcome of the manual high speed photography. However, this does not intend to limit the order of automatic high speed photography and manual high speed photography. Automatic high speed photography and manual high speed photography may selectively be performed, and they may be performed three or more times.

In the above embodiments, the controller 340 in the image sensor has been described as the entity for all the operations. However, this is merely an example for one or more processors in the electronic device, and the operations as per the embodiments may also be performed by other various processors in the electronic device, as well as the controller 340. For example, in various embodiments set forth herein, the controller 340 may be referred to as a first processor, and the processor 510 in the external circuit 370 may be referred to as a second processor. The frame rates 120 fps and 960 fps, used in the above embodiments may be varied depending on the settings of the electronic device or the performance of the interface.

Figure 7:
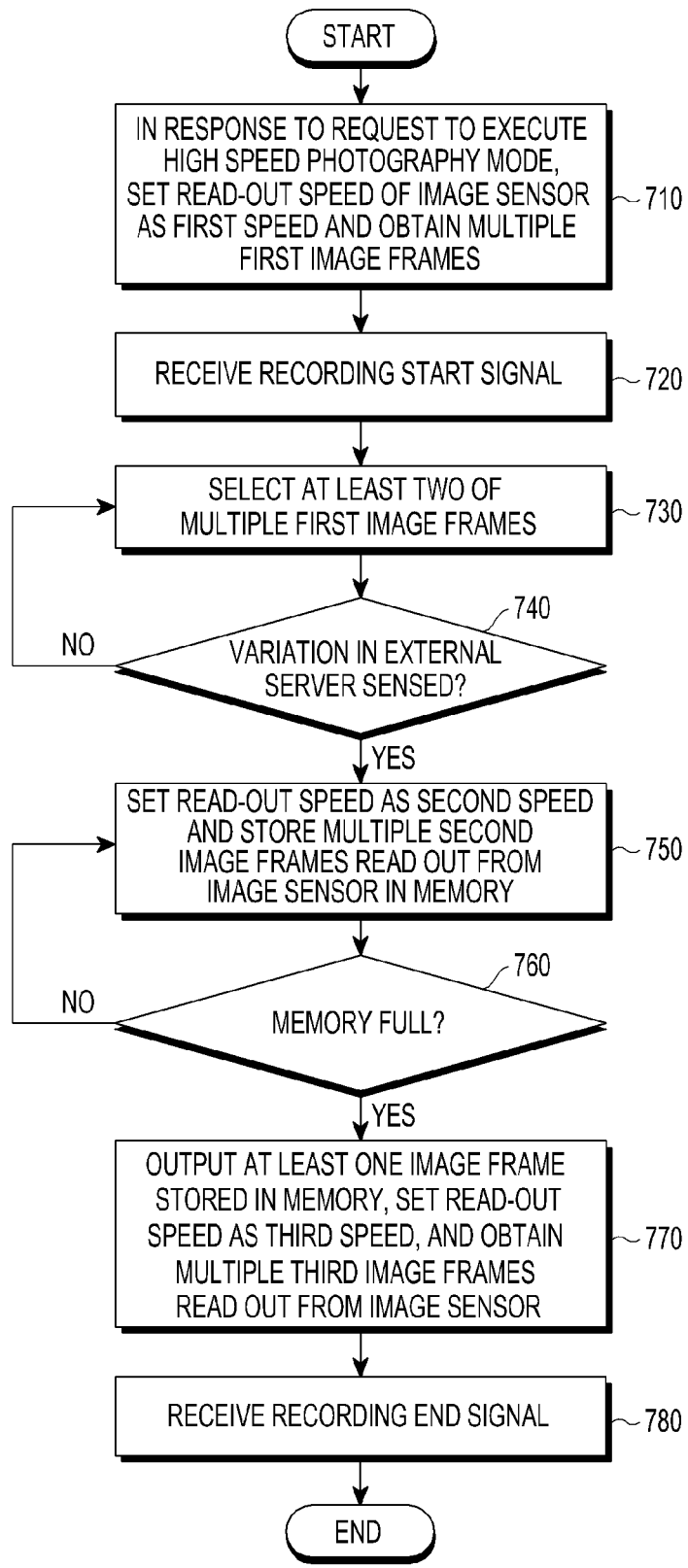
FIG. 7 illustrates a flowchart of a method for performing automatic high-speed photography using an electronic device according to an embodiment of the present disclosure.

FIG. 7 illustrates a flowchart of a method for performing automatic high speed photography using an electronic device according to an embodiment of the present disclosure.

In an image sensor (e.g., 300) including a controller (e.g., 340) and a memory (e.g., 350), the controller may be an entity that performs the method. Here, the image sensor may include at least one of a pixel array 310, a row-driver 320, a column-readout circuit 330, a controller 340, a memory 350, and an interface 360.

Referring to FIG. 7, in operation 710, the controller may set the read-out speed of the column-readout circuit as a first speed (or a first frame rate) in response to a signal related to execution of a high speed photography mode, and the controller 340 may obtain a first plurality of image frames read out at the first speed. For example, the high speed photography mode may be executed upon receiving a touch input to a first icon displayed on the display. The controller may receive the signal related to the execution of the high speed photography corresponding to receiving the user's touch input to the first icon displayed on the display. The controller may set the read-out speed of the column-readout circuit as, e.g., 120 fps, in response to the execution of the high speed photography mode. Where the read-out speed is set as 120 fps, the column-readout circuit may read-out 120 image frames per second based on light received by the pixel array.

In operation 720, the controller may receive a signal related to starting recording. For example, recording may be executed upon receiving a touch input to a second icon displayed on the display. The controller may receive the signal related to starting recording corresponding to receiving the user's touch input to the second icon displayed on the display.

Meanwhile, it may readily be appreciated by one of ordinary skill in the art that besides where a touch input to the first or second icon displayed on the display is received, high speed photography or recording may also be executed or started corresponding to a signal received through various input device (e.g., a hard key) provided in the electronic device.

In operation 730, the controller may select at least two of a first plurality of image frames read out at the first speed from the column-readout circuit. For example, the controller may select a first image frame and a second image frame which are continuously read out among the first plurality of image frames read out at 120 fps. In other words, the first image frame and the second image frame are image frames continuously read out at an interval of ¹⁄₁₂₀ seconds.

In operation 740, the controller may detect a variation associated with an external object using at least two image frames. For example, the controller may select, as the first and second image frames, two image frames obtained latest among the first plurality of image frames read out at 120 fps. Where a difference between a first brightness of the selected first image frame and a second brightness of the selected second image frame exceeds a preset threshold, the controller may determine that the variation associated with the external object has occurred between the time when the first image frame was obtained and the time when the second image frame was obtained. Corresponding to the variation associated with the external object, the controller may perform operation 750 for increasing the read-out speed.

Where a difference between a first brightness of the selected first image frame and a second brightness of the selected second image frame is equal or smaller than the preset threshold, the controller may determine that no variation associated with the external object has occurred between the time when the first image frame was obtained and the time when the second image frame was obtained. In this case, the controller may repeat operations 730 and 740 to keep detecting a variation associated with the external object.

In operation 750, the controller may set the read-out speed as a second speed, and the controller may store a plurality of image frames read out at the second speed in the memory. For example, corresponding to a variation associated with the external object, the controller may change the read-out speed from the first speed (e.g., 120 fps) to the second speed (e.g., 960 fps). Where the read-out speed is set as 960 fps, the column-readout circuit may read-out 960 image frames per second based on light received by the pixel array. The controller may store a second plurality of image frames read out at the second speed in the memory.

In operation 760, the controller may determine whether the storage of the memory is full. For example, 960 second image frames as read out at 960 fps may be stored per second in the memory. The controller may determine whether the storage of the memory 350 is full of the second plurality of image frames read out at 960 fps. Upon determining that the memory is not full, the controller may repeat operations 750 and 760 and determine whether the storage of the memory 350 is full.

In contrast, upon determining that the memory is full, the controller may pause storing the second plurality of image frames in the memory 350 and perform operation 770. In operation 770, the controller may output at least one image frame stored in the memory 350 to an external circuit (e.g., 370). The controller may change the read-out speed, which has been set as the second speed, to a third speed, and the controller may obtain a third plurality of image frames read out at the third speed. For example, the third speed may be lower than 960 fps. For example, the third speed may be 120 fps. The controller may obtain the third plurality of image frames read out at 120 flps.

In operation 780, the controller may receive a signal related to ending recording. In response to the received signal, the controller may lower the read-out speed of the column-readout circuit to less than the third speed. For example, even when recording is ended, a preview image may be output through the display of the electronic device. The controller may set the read-out speed as 30 fps according to the output speed of the preview image. Meanwhile, upon receiving at least some of the first plurality of image frames output from the image sensor and at least some of the second plurality of image frames and the third plurality of image frames, the processor of the external circuit 370 (e.g., 370) may generate a slow motion movie using the received image frames. For example, the slow motion movie may be constituted of a 120 fps movie and a 960 fps movie.

Figure 8:
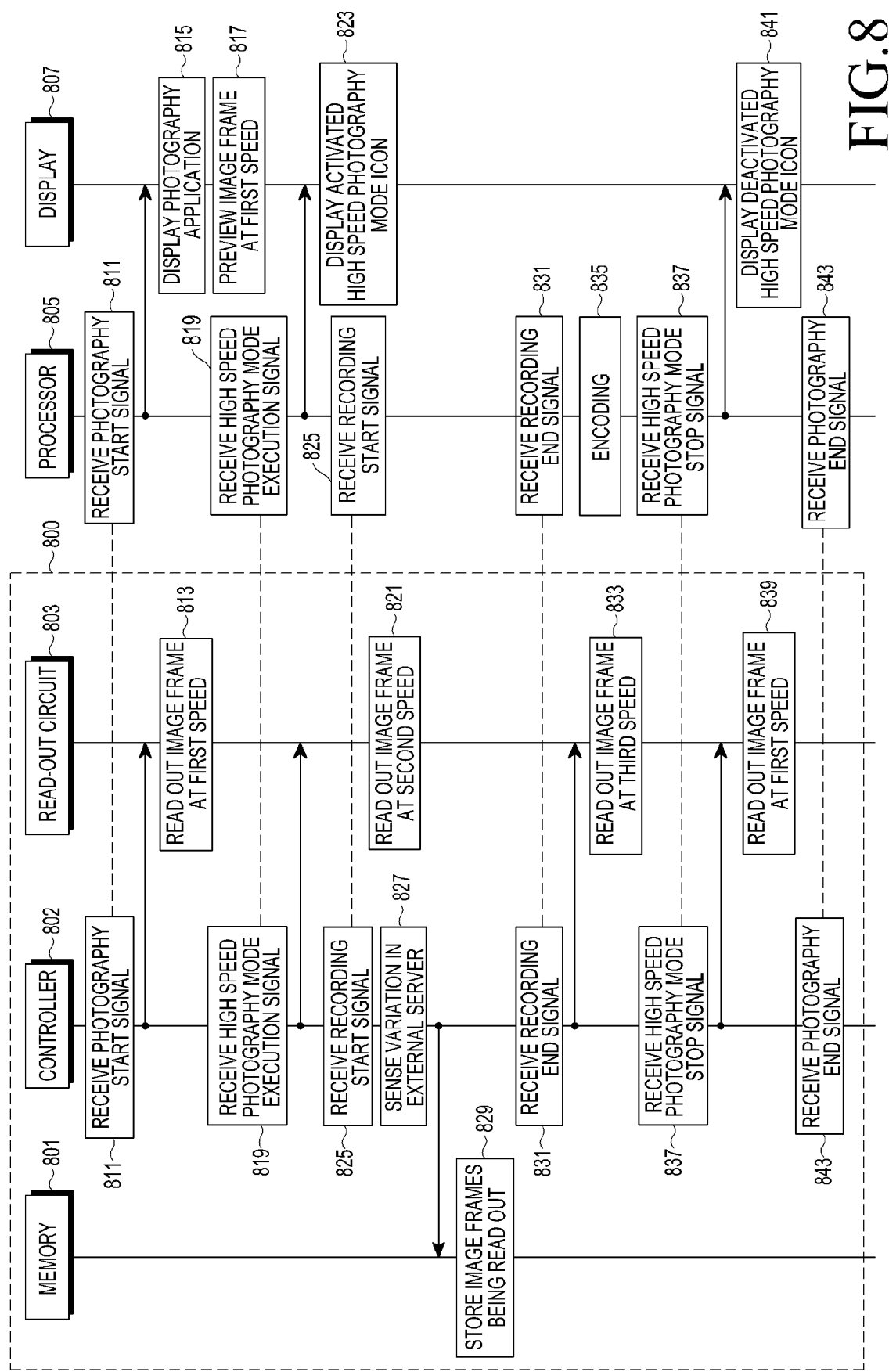
FIG. 8 illustrates a flowchart of a method for performing high speed photography using an electronic device according to an embodiment of the present disclosure.
Figure 9:
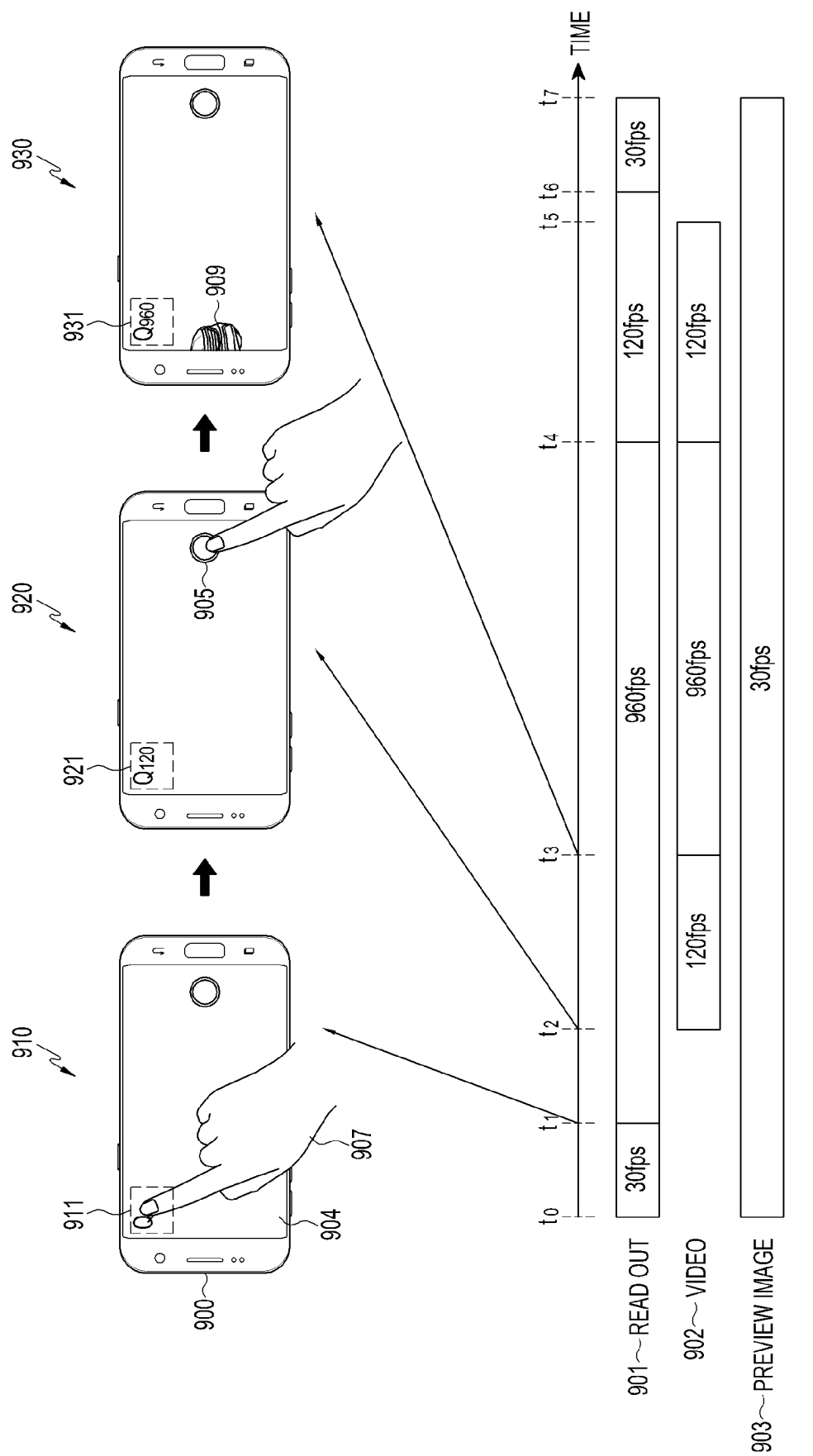
FIG. 9 illustrates a view of, over time, a method for performing high speed photography using an electronic device according to an embodiment of the present disclosure.

FIGS. 8 and 9 are views illustrating a method for performing high speed photography using an electronic device according to an embodiment of the present disclosure.

FIG. 8 illustrates a flowchart of a method for performing high speed photography using an electronic device according to an embodiment of the present disclosure.

In an image sensor 800 including a memory 801, a controller 802, and a read-out circuit 803, the controller may be an entity that performs the method. Or, in an electronic device (e.g., 101 or 201) including the image sensor 800, a processor 805, and a display 807, the processor may be an entity that performs the method. The image sensor 800 may include the whole or part of the image sensor 300 of FIG. 3.

Referring to FIG. 8, in operation 811, the controller 802 or the processor 805 may receive a signal related to the start of photography (or videography, videotaping). For example, photography may start corresponding to the user of the electronic device executing a photography application. The controller 802 may deliver a command corresponding to the received signal to the read-out circuit 803. The processor 805 may deliver the command corresponding to the received signal to the display 807.

For example, corresponding to the received signal, the controller 802 may activate the read-out circuit 803. In operation 813, the controller 802 may set the read-out speed, which is the output speed of the read-out circuit, as a first speed (e.g., 30 fps).

Corresponding to the received signal, the processor 805 may execute the photography application and display, through the display 807, a user interface (UI) corresponding to the executed photography application. In operation 815, the processor 805 may display the UI corresponding to the photography application through the display 807. In operation 817, the processor 805 may display, through the display 807, at least some of image frames output from the image sensor 800, as a preview image.

In operation 819, the controller 802 or the processor 805 may receive a signal related to execution of a high speed photography mode. For example, the high speed photography mode may be executed upon receiving a touch input to a first icon displayed on the display 807. The controller 802 or the processor 805, upon receiving the user's touch input to the first icon displayed on the display 807, may execute the high speed photography mode. The controller 802 may deliver a command corresponding to the received signal to the read-out circuit 803. The processor 805 may deliver the command corresponding to the received signal to the display 807.

For example, corresponding to the received signal, the controller 802 may vary the read-out speed of the read-out circuit 803. In operation 821, the controller 802 may change the read-out speed of the read-out circuit 803 from a first speed (e.g., 30 fps) to a second speed (e.g., 120 fps or 960 fps).

Corresponding to the received signal, the processor 805 may activate a first icon, e.g., a high speed photography mode icon, displayed on the display 807. In operation 823, the processor 805 may display the activated high speed photography mode icon through the display 807.

In operation 825, the controller 802 or the processor 805 may receive a signal related to the start of recording. For example, recording may be executed upon receiving a touch input to a second icon displayed on the display 807. Corresponding to receiving the user's touch input to the second icon displayed on the display 807, the controller 802 or processor 805 may receive a signal related to the start of recording.

Meanwhile, corresponding to the received signal, the controller 802 may select at least two image frames among a plurality of image frames read out through the read-out circuit 803. For example, the controller 802 may select a first image frame and a second image frame, which are continuously obtained, among the plurality of image frames read out at the second speed (e.g., 120 fps or 960 fpls) through the read-out circuit 803.

In operation 827, the controller 802 may detect a variation associated with an external object. For example, the controller 802 may compare the selected first and second image frames and differentiate between the first image frame and the second image frame. Where the variation associated with the external object is detected through a difference between the first image frame and the second image frame, in operation 829, the controller 802 may store image frames being read out in the memory 801.

In operation 831, the controller 802 or the processor 805 may receive a signal related to the end of recording. For example, recording may be ended upon receiving again a touch input to the second icon displayed on the display 807. Corresponding to receiving again the user's touch input to the second icon displayed on the display 807, the controller 802 or processor 805 may receive a signal related to the end of recording. The controller 802 may deliver a command corresponding to the received signal to the read-out circuit 803. The processor 805 may perform encoding corresponding to the received signal in operation 835.

For example, corresponding to the received signal, the controller 802 may vary the read-out speed of the read-out circuit 803. In operation 833, the controller 802 may change the read-out speed of the read-out circuit 803 from the second speed (e.g., 120 fps or 960 fps) to a third speed (e.g., 120 fps).

Corresponding to the received signal, in operation 835, the processor 805 may perform encoding to generate a video based on the image frames output from the image sensor 800.

In operation 837, the controller 802 or the processor 805 may receive a signal related to pausing the high speed photography mode. For example, the high speed photography mode may be paused upon receiving again a touch input to the first icon displayed on the display 807. The controller 802 or the processor 805, upon receiving again the user's touch input to the first icon displayed on the display 807, may pause the high speed photography mode. The controller 802 may deliver a command corresponding to the received signal to the read-out circuit 803. The processor 805 may deliver the command corresponding to the received signal to the display 807.

For example, corresponding to the received signal, the controller 802 may vary the read-out speed of the read-out circuit 803. In operation 839, the controller 802 may change the read-out speed of the read-out circuit 803 from the third speed (e.g., 120 fps) to the first speed (e.g., 30 fps).

Corresponding to the received signal, the processor 805 may deactivate the first icon, e.g., a high speed photography mode icon, displayed on the display 807. In operation 841, the processor 805 may display the deactivated high speed photography mode icon through the display 807.

In operation 843, the controller 802 or the processor 805 may receive a signal related to the end of photography. For example, photography may end corresponding to the user of the electronic device ending the photography application. The controller 802 may deliver a command corresponding to the received signal to the read-out circuit 803. The processor 805 may deliver the command corresponding to the received signal to the display 807.

For example, corresponding to the received signal, the controller 802 may deactivate the read-out circuit 803.

Corresponding to the received signal, the processor 805 may end the photography application.

FIG. 9 illustrates a view of, over time, a method for performing high speed photography using an electronic device according to an embodiment of the present disclosure.

In an electronic device (e.g., 101 or 201) including one or more processors, an image sensor, and a display, the one or more processors may be the entity to perform the method. The image sensor may include the whole or part of the image sensor 300 of FIG. 3. One or more processors may include the controller (e.g., 340) or processor (e.g., 510) included in the image sensor.

Referring to FIG. 9, according to an embodiment of the present disclosure, a total of three sub-views 910, 920, and 930 are shown which are related to a method for performing high speed photography using an electronic device. FIG. 9 illustrates a first graph 901 indicating the read-out speed varying over time, a second graph 902 indicating the speed at which image frames constituting a video are obtained, and a third graph 903 indicating the output speed of preview images displayed through a display.

According to an embodiment of the present disclosure, one or more processors may receive a request related to the start of photography at t0. The one or more processors may set the read-out speed of the read-out circuit as 30 fps corresponding to the request received at t0. The one or more processors may simultaneously display, through the display at 30 fps, image frames output from the image sensor as a preview image.

The one or more processors may receive a request related to execution of the high speed photography mode at t1. Referring to sub-view 910, the high speed photography mode may be executed upon receiving a touch input to a first icon 911 displayed on the display 904. The one or more processors may execute the high speed photography mode upon receiving the user 907's touch input to the first icon 911 displayed on the display 904. The one or more processors may change the read-out speed of the read-out circuit to 960 fps corresponding to the request received at t1. The one or more processors may simultaneously display, at 30 fps, some of the image frames read out at 960 fps as preview images through the display 904.

The one or more processors may receive a request related to the start of recording at t2. Referring to sub-view 920, recording may be executed upon receiving a touch input to a second icon 905 displayed on the display 904. The one or more processors may start recording upon receiving the user 907's touch input to the second icon 905 displayed on the display 904. The one or more processors may obtain some of the image frames read out at 960 fps corresponding to the request received at t2. For example, the one or more processors may obtain one out of every eight image frames read out at 960 fps, allowing for such an effect as if image frames read out substantially at 120 fps are obtained. The one or more processors may generate a 120 fps video using the image frames which are read out at substantially 120 fps. Meanwhile, the one or more processors may display, through the activated first icon 921, the '120 fps' which represents the substantial speed at which the obtained image frames are read out.

The one or more processors may detect a variation associated with an external object at t3. Referring to sub-view 930, the one or more processors may detect a variation associated with the external object 909 based on at least two image frames among image frames read out between t2 and t3. Corresponding to the variation associated with the external object 909 detected at t3, the one or more processors may store all of the image frames read out at 960 fps in the memory (e.g., 350) provided in the image sensor. The one or more processors may have such an effect as if the image frames read out at 960 fps are obtained at 960 fps by storing all of the image frames read out at 960 fps in the memory. For example, the one or more processors may generate a 960 fps video using the image frames stored in the memory. Meanwhile, the one or more processors may display, through the activated first icon 931, the '960 fps' which represents the speed at which the obtained image frames are read out.

The one or more processors may change the read-out speed of the read-out circuit to 120 fps when a preset event occurs at t4. For example, the preset event may include when the storage of the memory inside the image sensor is full. The preset event may include when no further variation associated with the external object is detected. The preset event may include when a preset time elapses. The preset event may include when a signal related to ending high speed photography is received from the outside.

For example, the one or more processors may recognize the moment that the storage of the memory in the image sensor is full as t4. The one or more processors, upon determining that the memory in the image sensor cannot store more image frames, may decrease the read-out speed.

The one or more processors may recognize, as t4, the moment that the variation associated with the external object is determined to stop. The one or more processors may determine whether no further variation associated with the external object is detected based on at least two of image frames read out from the image sensor or at least two of image frames stored in the memory. The one or more processors may change the read-out speed from 960 fps to 120 fps, corresponding to detecting no further variation associated with the external object at t4.

Meanwhile, the one or more processors may generate a 120 fps video using the image frames read out at 120 fps after t4.

The one or more processors may receive a request related to the end of recording at t5. Referring to sub-view 920, recording may be ended upon receiving again a touch input to the second icon 905 displayed on the display 904. The one or more processors may end recording upon receiving again the user's touch input to the second icon 905 displayed on the display 904. The one or more processors may pause generating a video using the image frames read out at 120 fps corresponding to the request received at t5.

Meanwhile, the one or more processors may start encoding to generate a video from t5 when recording ends. For example, the one or more processors may store, in the memory 550, some of the plurality of first images read out between t2 and t3, all of the second plurality of image frames read out between t3 and t4, and some of the third plurality of image frames read out between t4 and t5, and the one or more processors may encode the image frames stored in the memory 550 from t5 when the request related to ending recording is received. When encoding is done, the one or more processors may store the encoded video in the memory 550.

The one or more processors may receive a request related to pausing the high speed photography mode at t6. Referring to sub-view 910, the high speed photography mode may pause upon receiving again a touch input to the first icon 911 displayed on the display 904. The one or more processors may pause the high speed photography mode upon receiving again the user's touch input to the first icon 911 displayed on the display 904. The one or more processors may change the read-out speed to 30 fps corresponding to the request received at t6.

The one or more processors may receive a request related to the end of photography at t7. The one or more processors may deactivate the image sensor corresponding to the request received at t7. Simultaneously, the one or more processors may control the display not to display preview images any longer.

Figure 10:
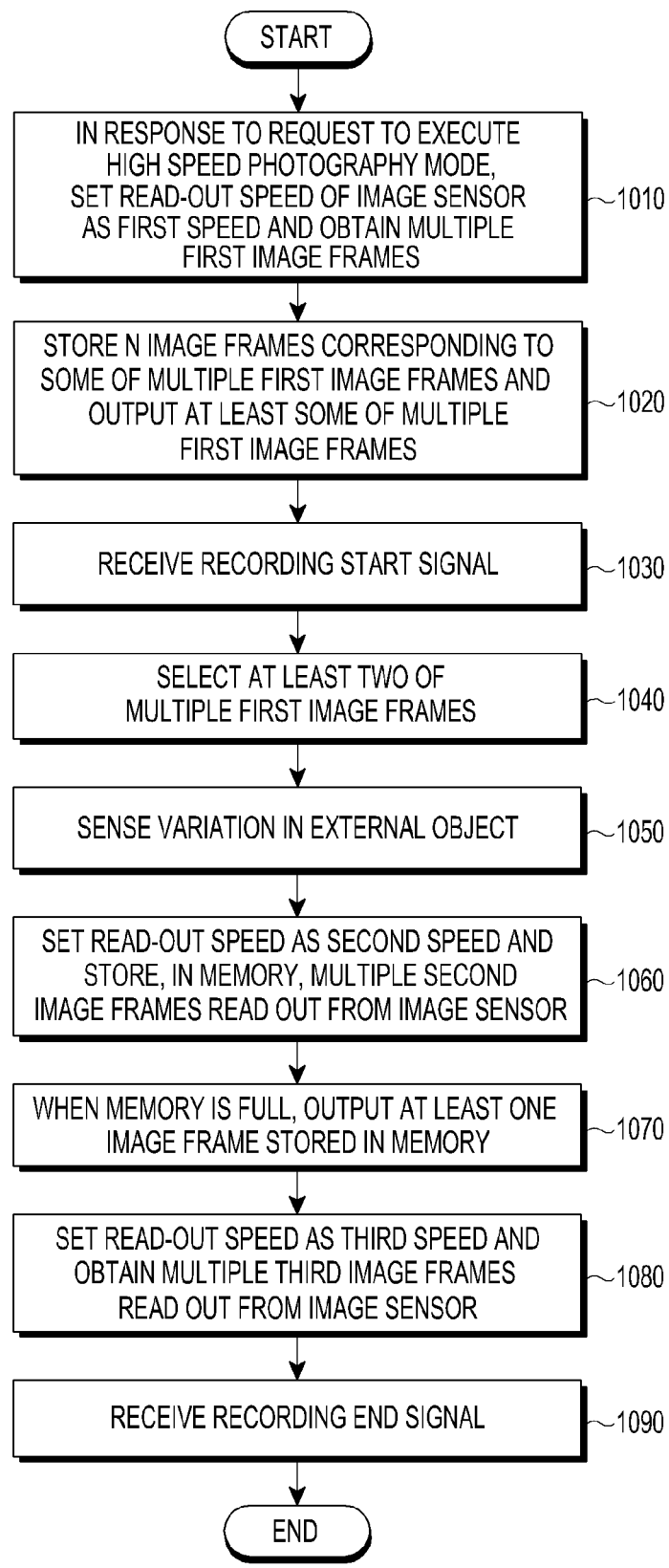
FIG. 10 illustrates a flowchart of a method for utilizing a buffer memory according to an embodiment of the present disclosure.
Figure 11:
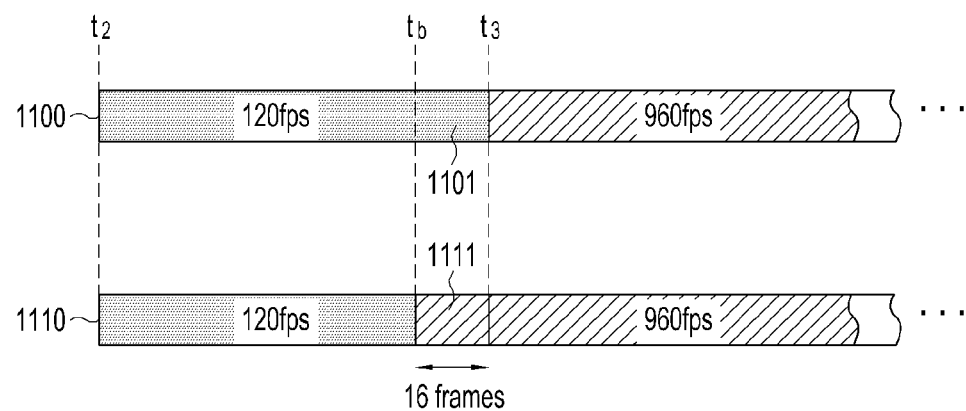
FIG. 11 illustrates a view of, over time, a method for utilizing a buffer memory according to an embodiment of the present disclosure.
Figure 12:
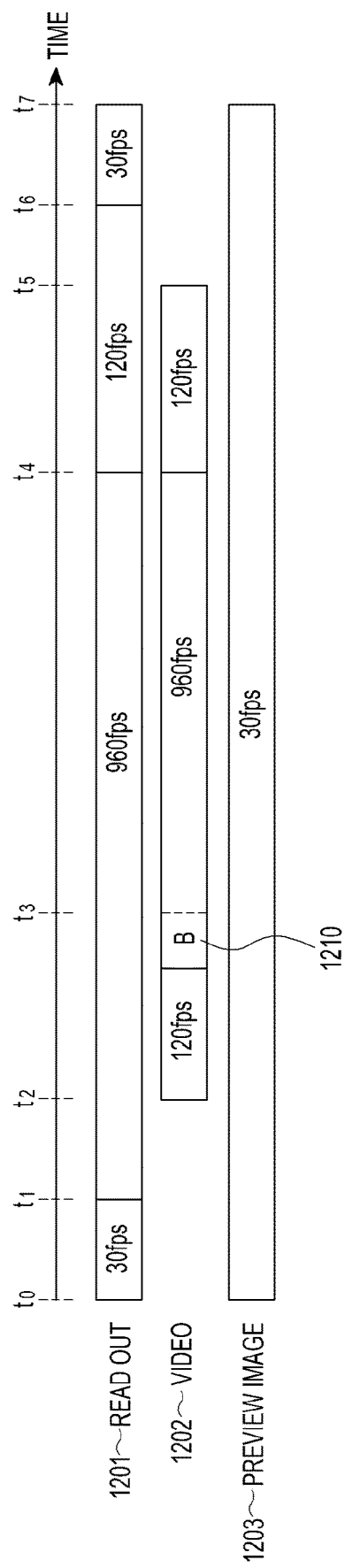
FIG. 12 illustrates a view of, over time, a method for utilizing a buffer memory according to an embodiment of the present disclosure.

FIGS. 10 to 12 are flowcharts illustrating methods for utilizing a buffer memory in performing high speed photography using an electronic device according to an embodiment of the present disclosure.

FIG. 10 illustrates a flowchart of a method for utilizing a buffer memory according to an embodiment of the present disclosure.

In an image sensor (e.g., 300) including a controller (e.g., 340) and a memory (e.g., 350), the controller may be an entity that performs the method. Here, the image sensor may include at least one of a pixel array 310, a row-driver 320, a column-readout circuit 330, a controller 340, a memory 350, and an interface 360.

Referring to FIG. 10, in operation 1010, the controller may set the read-out speed of the column-readout circuit as a first speed (or a first frame rate) in response to a request related to execution of a high speed photography mode, and the controller 340 may obtain a first plurality of image frames read out at the first speed. For example, the high speed photography mode may be executed upon receiving a touch input to a first icon displayed on the display. The controller may receive the signal related to the execution of the high speed photography corresponding to receiving the user's touch input to the first icon displayed on the display. The controller may set the read-out speed of the column-readout circuit as a high speed, e.g., 960 fps, in response to the execution of the high speed photography mode. Where the read-out speed is set as 960 fps, the image sensor may read-out 960 image frames per second based on light received by the pixel array 310.

In operation 1020, the controller may store, in the memory 350, N image frames corresponding to some of a first plurality of image frames read out at a first speed. For example, the controller may store, in the memory provided in the image sensor, N image frames read out latest among the first plurality of image frames read out at 960 fps. N may be a non-zero integer preset by the user. Meanwhile, the controller may output some of the first plurality of image frames read out at the first speed to an external circuit 370. Some of the first plurality of image frames output to the external circuit may be used as preview images or to generate a video. For example, some of the first plurality of image frames output to the external circuit may be ones each of which is output out of every eight first image frames read out at 960 fps. In this case, the image frames output to the external circuit may be deemed image frames read out at substantially 120 fps, and thus, the generated video may be a 120 fps video.

In operation 1030, the controller may receive a request related to starting recording. For example, recording may be executed upon receiving a touch input to a second icon displayed on the display. The controller may receive the signal related to starting recording corresponding to receiving the user's touch input to the second icon displayed on the display.

Meanwhile, it may readily be appreciated by one of ordinary skill in the art that besides where a touch input to the first or second icon displayed on the display is received, high speed photography or recording may also be executed or started corresponding to a signal received through various input device (e.g., a hard key) provided in the electronic device.

In operation 1040, the controller may select at least two of a first plurality of image frames read out at the first speed from the column-readout circuit. For example, the controller may select a first image frame and a second image frame which are continuously read out among the first plurality of image frames read out at 960 fps. In other words, the first image frame and the second image frame are image frames continuously read out at an interval of 1/960 seconds.

In operation 1050, the controller may detect a variation associated with an external object using at least two image frames. For example, the controller may select, as the first and second image frames, two image frames obtained latest among the first plurality of image frames read out at 960 fps. Where a difference between a first brightness of the selected first image frame and a second brightness of the selected second image frame exceeds a preset threshold, the controller may determine that the variation associated with the external object has occurred between the time when the first image frame was obtained and the time when the second image frame was obtained.

By contrast, where a difference between a first brightness of the selected first image frame and a second brightness of the selected second image frame is equal or smaller than the preset threshold, the controller may determine that no variation associated with the external object has occurred between the time when the first image frame was obtained and the time when the second image frame was obtained.

Upon detecting a variation associated with the external object, the controller may store N image frames determined in the memory 350. For example, the controller may store, in the memory 350, N latest image frames read out among the image frames read out at 960 fps while simultaneously delivering, 120 fps, some of the image frames read out at 960 fps to the external circuit. Meanwhile, upon detecting a variation associated with the external object, the controller 340 or processor 510 may delete image frames overlapping the N image frames stored in the memory 350 among the image frames delivered at 120 fps to the external circuit. After completing the deletion of the overlapping image frames, the controller may delivery the N image frames stored in the memory 350 to the external circuit.

Further, upon detecting a variation associated with the external object, in operation 1060, the controller may set the read-out speed as a second speed and store, in the memory 350, a second plurality of image frames read out at the second speed. For example, corresponding to a variation associated with the external object, the controller may change the read-out speed from the first speed (e.g., 960 fps) to the second speed (e.g., 960 fps or 1000 fps) or maintain the second speed. Where the read-out speed remains 960 fps, the column-readout circuit may read-out 960 image frames per second based on light received by the pixel array. The controller may store the second plurality of image frames read out at the second speed in the memory 350.

In operation 1070, where the memory 350 is full, the controller may output at least one image stored in the memory. For example, 960 second image frames as read out at 960 fps may be stored per second in the memory. The controller may determine whether the storage of the memory is full of the second plurality of image frames read out at 960 fps. Upon determining that the memory is full, the controller may stop storing the second plurality of image frames in the memory and output at least one image frame stored in the memory to the external circuit.

In operation 1080, the controller may change the read-out speed, which has been set as the second speed (e.g., 960 fps or 1000 fps), to a third speed (e.g., 120 fps), and the controller may obtain a third plurality of image frames read out at the third speed. For example, the third speed may be lower than 960 fps. For example, the third speed may be 120 fps. The controller may obtain the third plurality of image frames read out at 120 flps.

In operation 1090, the controller may receive a signal related to ending recording. In response to the received signal, the controller may lower the read-out speed of the column-readout circuit to less than the third speed. For example, even when recording is ended, a preview image may be output through the display of the electronic device. The controller may set the read-out speed as 30 fps according to the output speed of the preview image. Meanwhile, upon receiving at least some of the first plurality of image frames output from the image sensor and at least some of the second plurality of image frames and the third plurality of image frames, the processor of the external circuit 370 (e.g., 370) may generate a slow motion movie using the received image frames. For example, the slow motion video may be constituted of a 120 fps video and a 960 fps video.

According to an embodiment of the present disclosure, the processor of the external circuit may generate a first portion of the video based on at least some of the first plurality of image frames. The first portion may be a 120 fps video. The processor of the external circuit may generate a second portion of the video based on the N image frames stored in the memory 350 and the second plurality of image frames. The second portion may be a 960 fps video. The processor of the external circuit may generate a third portion of the video based on at least some of the third plurality of image frames. The third portion may be a 120 fps video. For example, the video may include the first portion, second portion, and third portion in the order thereof. Meanwhile, the one or more processors may compare at least some of the first plurality of image frames and the N image frames stored in the memory 350, and when there are overlapping image frames, the one or more processors may delete one of the overlapping image frames.

FIG. 11 illustrates a view of, over time, a method for utilizing a buffer memory according to an embodiment of the present disclosure. Here, the buffer memory may mean a memory (e.g., 350) provided inside an image sensor (e.g., 300).

FIG. 11 shows a first graph 1100 indicating the speed obtained for image frames constituting a first video generated by an electronic device with no buffer memory and a second graph 1110 indicating the speed obtained for image frames constituting a second video generated by an electronic device with a buffer memory.

According to an embodiment of the present disclosure, a controller (e.g., 340) may receive a request related to the start of recording at t2. Corresponding to the request received at t2, the controller may deliver some of image frames read out at 960 fps to an external circuit (e.g., 370). For example, the controller may deliver only one out of every eight image frames read out at 960 fps to the external circuit. In this case, the image frames delivered to the external circuit may be the same as image frames read out at substantially 120 fps. The processor of the external circuit may generate a 120 fps video using the image frames which are read out at substantially 120 fps. Meanwhile, in the first graph 1100, the video configured between t2 and t3 is a 120 fps video, and in the second graph 1110, the video configured between t2 and tb is a 120 fps video.

The controller may detect a variation associated with the external object at t3. The controller may store, in the buffer memory, all of the image frames read out at 960 fps from the image sensor, corresponding to the variation associated with external object detected at t3.

Meanwhile, since the controller of the electronic device as per the first graph 1100 stores, in the buffer memory, all of the image frames read out at 960 fps after t3 when the variation associated with the external object is detected, the controller may generate a 960 fps video from t3. In contrast, the controller of the electronic device as per the second graph 1110 may steadily store at 960 fps, in the buffer memory, a designated number, e.g., 16, of image frames from t2 when recording begins, and thus, the controller may generate a 960 fps video even with 16 image frames right before t3 when the variation associated with the external object is detected.

Corresponding to the request received at t2, the controller of the electronic device as per the second graph 1110 may store at 960 fps, in the buffer memory of the image sensor, N latest image frames read out among the image frames read out at 960 fps. Storing N image frames in the buffer memory may be repeated until t3 when the variation associated with the external object is detected. For example, the buffer memory may store 16 image frames obtained right before detecting the variation associated with the external object. Assuming that the image frame obtained at t3 when the variation associated with external object is detected is the Nth obtained N frame, the N−16 frame obtained at tb through the N−1 frame obtained immediately before t3 may be stored in the buffer memory.

The controller of the electronic device as per the second graph 1110 may delete, from the memory, image frames 1101 overlapping the N image frames stored in the buffer memory among the image frames obtained at substantially 120 fps right before t3 when the variation associated with the external object is detected. After the deletion of the overlapping image frames 1101 is complete, the controller may generate a 960 fps video using the N image frames 1111 stored in the buffer memory.

FIG. 12 illustrates a view of, over time, a method for utilizing a buffer memory according to an embodiment of the present disclosure.

In an electronic device (e.g., 101 or 201) including one or more processors, an image sensor, and a display, the one or more processors may be the entity to perform the method. The image sensor may include the whole or part of the image sensor 300 of FIG. 3. One or more processors may include the controller (e.g., 340) or processor (e.g., 510) included in the image sensor.

Like FIG. 9, FIG. 12 illustrates a first graph 1201 indicating the read-out speed varying over time, a second graph 1202 indicating the speed at which image frames constituting a video are obtained, and a third graph 1203 indicating the output speed of preview images displayed through a display.

According to an embodiment of the present disclosure, one or more processors may receive a request related to the start of photography at t0. The one or more processors may receive a request related to execution of the high speed photography mode at t1. The one or more processors may receive a request related to the start of recording at t2. The one or more processors may detect a variation associated with an external object at t3. Corresponding to the variation associated with the external object detected at t3, the one or more processors may store all of the image frames read out at 960 fps in the memory (e.g., 350) provided in the image sensor. In other words, the one or more processors may have such an effect as if the image frames read out at 960 fps are obtained at 960 fps by storing all of the image frames read out at 960 fps in the memory. For example, the one or more processors may generate a 960 fps video using the image frames stored in the memory. The one or more processors may delete, from the memory, image frames overlapping the image frames 1210 stored in the buffer memory among the image frames obtained at substantially 120 fps. After the overlapping image frames are completely deleted, the one or more processors may store, in the memory, the N image frames 1210 stored in the buffer memory.

The one or more processors may change the read-out speed of the read-out circuit to 120 fps when a preset event occurs at t4. For example, the preset event may include when the storage of the memory inside the image sensor is full. The preset event may include when no further variation associated with the external object is detected. The preset event may include when a preset time elapses. The preset event may include when a signal related to ending high speed photography is received from the outside.

For example, the one or more processors may recognize the moment that the storage of the memory in the image sensor is full as t4. The one or more processors, upon determining that the memory in the image sensor cannot store more image frames, may decrease the read-out speed.

The one or more processors may recognize, as t4, the moment that the variation associated with the external object is determined to stop, and the one or more processors may receive a request related to the end of recording at t5. For example, recording may be ended upon receiving again a touch input to the second icon displayed on the display. The one or more processors may end recording upon receiving again the user's touch input to the second icon displayed on the display. The one or more processors may pause generating a video using the image frames read out at 120 fps corresponding to the request received at t5.

Meanwhile, the one or more processors may start encoding to generate a video from t5 when recording ends. For example, the one or more processors may store, in the memory 550, some of the plurality of first images read out between t2 and t3, all of the second plurality of image frames read out between t3 and t4, and some of the third plurality of image frames read out between t4 and t5, and the one or more processors may encode the image frames stored in the memory 550 from t5 when the request related to ending recording is received. When encoding is done, the one or more processors may store the encoded video in the memory 550.

The one or more processors may receive a request related to pausing the high speed photography at t6 and receive a request related to the end of photography at t7.

Figure 13:
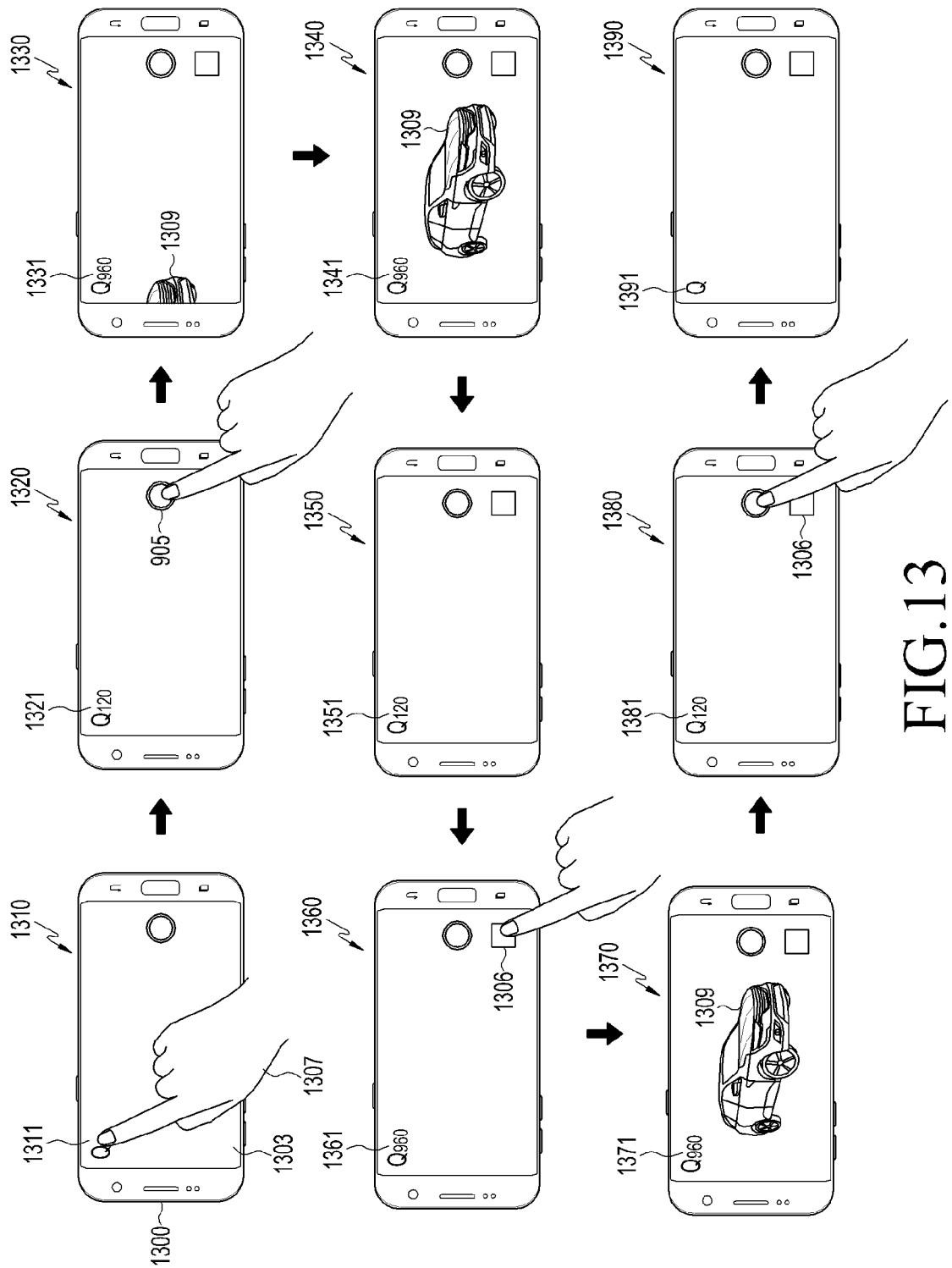
FIGS. 13 and 14 illustrate views of a method for performing high speed photography multiple times using an electronic device according to an embodiment of the present disclosure.
Figure 14:
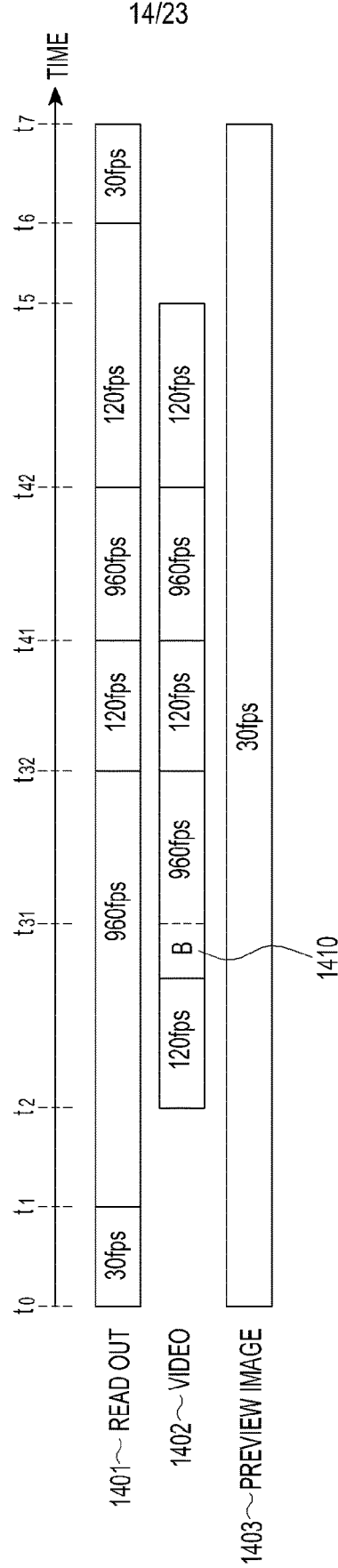

FIGS. 13 and 14 are views illustrating a method for performing high speed photography multiple times using an electronic device according to an embodiment of the present disclosure.

In an electronic device (e.g., 101 or 201) including one or more processors, an image sensor, and a display, the one or more processors may be the entity to perform the method. The image sensor may include the whole or part of the image sensor 300 of FIG. 3. One or more processors may include the controller (e.g., 340) or processor (e.g., 510) included in the image sensor.

Referring to FIG. 13, according to an embodiment of the present disclosure, a total of nine sub-views 1310, 1320, 1330, 1340, 1350, 1360, 1370, 1380, and 1390 are shown which are related to a method for performing high speed photography multiple times using an electronic device. FIG. 14 illustrates a first graph 1401 indicating the read-out speed varying over time, a second graph 1402 indicating the speed at which image frames constituting a video are obtained, and a third graph 1403 indicating the output speed of preview images displayed through a display.

According to an embodiment of the present disclosure, one or more processors may receive a request related to the start of photography at t0. The one or more processors may set the read-out speed of the read-out circuit as 30 fps corresponding to the request received at t0. The one or more processors may simultaneously display, through the display at 30 fps, image frames output from the image sensor as a preview image.

The one or more processors may receive a request related to execution of the high speed photography mode at t1. Referring to sub-view 1310, the high speed photography mode may be executed upon receiving a touch input to a first icon 1311 displayed on the display 1303. The one or more processors may execute the high speed photography mode upon receiving the user 1307's touch input to the first icon 1311 displayed on the display 1303. The one or more processors may change the read-out speed of the read-out circuit to 960 fps corresponding to the request received at t1. The one or more processors may simultaneously display, at 30 fps, some of the image frames read out at 960 fps as preview images through the display 1303.

The one or more processors may receive a request related to the start of recording at t2. Referring to sub-view 1320, recording may be executed upon receiving a touch input to a second icon 1305 displayed on the display 1303. The one or more processors may start recording upon receiving the user 1307's touch input to the second icon 1305 displayed on the display 1303. The one or more processors may obtain some of the image frames read out at 960 fps corresponding to the request received at t2. For example, the one or more processors may obtain one out of every eight image frames read out at 960 fps, allowing for such an effect as if image frames read out substantially at 120 fps are obtained. The one or more processors may generate a 120 fps video using the image frames which are read out at substantially 120 fps. Meanwhile, the one or more processors may display, through the activated first icon 1321, the '120 fps' which represents the substantial speed at which the obtained image frames are read out.

The one or more processors may detect a variation associated with an external object at t31. Upon detecting a variation associated with the external object, the processor may perform automatic high speed photography. Referring to sub-views 1330 and 1340, the one or more processors may detect a variation associated with the external object 1309 based on at least two image frames among image frames read out between t2 and t31. Corresponding to the variation associated with the external object 1309 detected at t31, the one or more processors may store all of the image frames read out at 960 fps in the memory (e.g., 350) provided in the image sensor. The one or more processors may have such an effect as if the image frames read out at 960 fps are obtained at 960 fps by storing all of the image frames read out at 960 fps in the memory. For example, the one or more processors may generate a 960 fps video using the image frames stored in the memory. The one or more processors may delete, from the memory, image frames overlapping the image frames 1410 stored in the buffer memory among the image frames obtained at substantially 120 fps. After the overlapping image frames are completely deleted, the one or more processors may store, in the memory, the N image frames 1410 stored in the buffer memory. Meanwhile, the one or more processors may display, through the activated first icon 1331 or 1341, the '960 fps' which represents the speed at which the memory stores.

The one or more processors may change the read-out speed of the read-out circuit to 120 fps when a preset event occurs at t32. For example, the preset event may include when the storage of the memory inside the image sensor is full. The preset event may include when no further variation associated with the external object is detected. The preset event may include when a preset time elapses. The preset event may include when a signal related to ending high speed photography is received from the outside.

For example, the one or more processors may recognize the moment that the storage of the memory in the image sensor is full as t32. The one or more processors, upon determining that the memory in the image sensor cannot store more image frames, may decrease the read-out speed.

The one or more processors may recognize, as t32, the moment that the variation associated with the external object is determined to stop. Upon detecting no more variation associated with the external object, the one or more processors may pause automatic high speed photography. Referring to sub-view 1350, the one or more processors may determine whether no further variation associated with the external object 1309 is detected based on at least two of image frames read out from the image sensor or at least two of image frames stored in the memory. The one or more processors may change the read-out speed from 960 fps to 120 fps, corresponding to detecting no further variation associated with the external object 1309 at t32. Meanwhile, the one or more processors may display, through the activated first icon 1351, the '120 fps' which represents the speed at which the obtained image frames are read out.

The one or more processors may receive a request related to the start of manual high speed photography from the user of the electronic device at t41. Referring to sub-views 1360 and 1370, the manual high speed photography may be started upon receiving a touch input to a third icon 1306 displayed on the display 1303. The one or more processors may start manual high speed photography upon receiving the user 1307's touch input to the third icon 1306 displayed on the display 1303. The one or more processors may receive a request related to the start of manual high speed photography from the user of the electronic device through an input/output interface (e.g., 150) provided in the electronic device. The one or more processors may raise the read-out speed of the read-out circuit to 960 fps corresponding to the request received at t41. Meanwhile, the one or more processors may display, through the activated first icon 1361 or 1371, the '960 fps' which represents the speed at which the obtained image frames are read out.

The one or more processors may change the read-out speed of the read-out circuit to 120 fps when a preset event occurs at t42. For example, the preset event may include when the storage of the memory inside the image sensor is full. The preset event may include when no further variation associated with the external object is detected. The preset event may include when a preset time elapses. The preset event may include when a signal related to ending high speed photography is received from the outside.

For example, the one or more processors may recognize the moment that the storage of the memory in the image sensor is full as t42. The one or more processors, upon determining that the memory in the image sensor cannot store more image frames, may decrease the read-out speed.

The one or more processors may receive a request related to the end of manual high speed photography from the user of the electronic device at t42. Referring to sub-view 1380, manual high speed photography may be ended upon receiving again a touch input to the third icon 1306 displayed on the display 1303. The one or more processors may end manual high speed photography upon receiving the user 1307's touch input to the third icon 1306 displayed on the display 1303. Corresponding to the request received at t42, the one or more processors may store all of the image frames read out at 960 fps in the memory (e.g., 350) provided in the image sensor. Meanwhile, the one or more processors may display, through the activated first icon 1381, the '120 fps' which represents the speed at which the obtained image frames are read out.

The one or more processors may receive a request related to the end of recording at t5. Referring to sub-view 1390, recording may be ended upon receiving again a touch input to the second icon 1305 displayed on the display 1303. The one or more processors may end recording upon receiving again the user's touch input to the second icon 1305 displayed on the display 1303. The one or more processors may pause generating a video using the image frames read out at 120 fps corresponding to the request received at t5. The one or more processors may end the high speed photography mode upon receiving the user 1307's touch input to the first icon 1391 displayed on the display 1303.

Meanwhile, the one or more processors may start encoding to generate a video from t5 when recording ends. For example, the one or more processors may store, in the memory 550, some of the plurality of first images read out between t2 and t31, all of the second plurality of image frames read out between t31 and t32, some of the third plurality of image frames read out between t32 and t41, all of the fourth plurality of image frames read out between t41 and t42, and some of the fifth plurality of image frames read out between t42 and t5, and the one or more processors may encode the image frames stored in the memory 550 from t5 when the request related to ending recording is received. When encoding is done, the one or more processors may store the encoded video in the memory 550.

The one or more processors may receive a request related to pausing the high speed photography mode at t6. Referring to sub-view 1310, the high speed photography mode may pause upon receiving again a touch input to the first icon 1311 displayed on the display 1303. The one or more processors may pause the high speed photography mode upon receiving again the user's touch input to the first icon 1311 displayed on the display 1303. The one or more processors may change the read-out speed to 30 fps corresponding to the request received at t6.

The one or more processors may receive a request related to the end of photography at t7. The one or more processors may deactivate the image sensor corresponding to the request received at t7. Simultaneously, the one or more processors may control the display not to display preview images any longer.

Figure 15A:
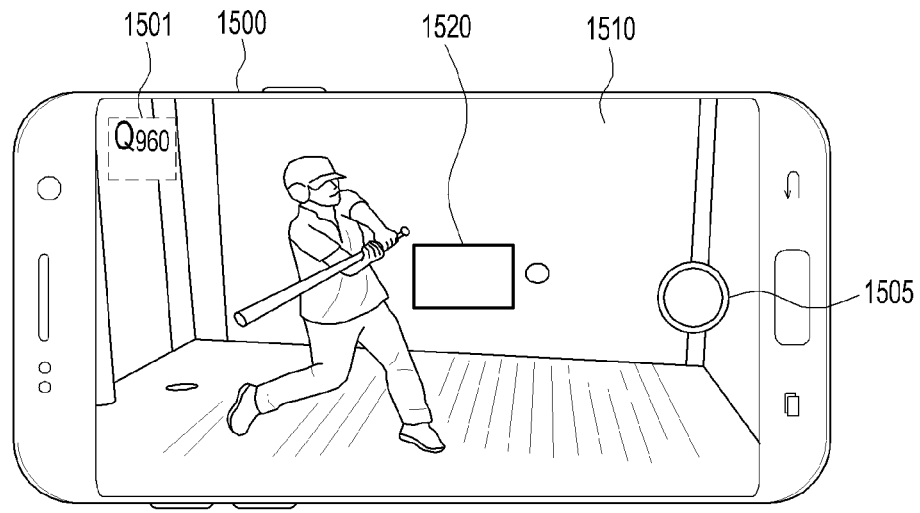
FIGS. 15A and 15B illustrate views of a method for setting a region of interest in an image frame obtained using an electronic device according to an embodiment of the present disclosure.
Figure 15B:
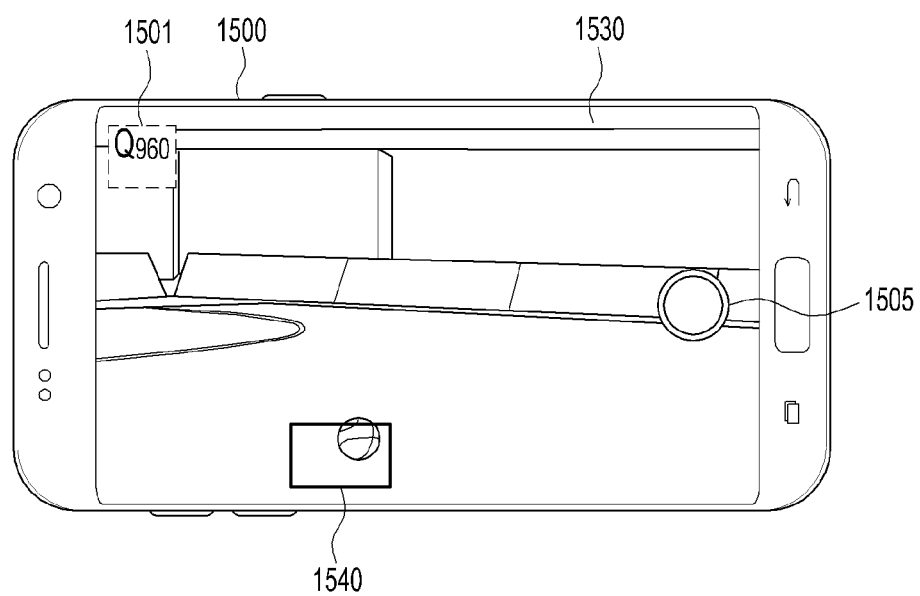

FIGS. 15A and 15B are views illustrating a method for setting a region of interest in an image frame obtained using an electronic device according to an embodiment of the present disclosure. In an electronic device (e.g., 101 or 201) including one or more processors, an image sensor, and a display, the one or more processors may be the entity to perform the method. The image sensor may include the whole or part of the image sensor 300 of FIG. 3. One or more processors may include the controller (e.g., 340) or processor (e.g., 510) included in the image sensor.

Referring to FIG. 15A, the one or more processors may display a fixed region of interest (ROI) 1520 on a plurality of image frames obtained through the image sensor.

According to an embodiment of the present disclosure, the one or more processors may display, on the display, at least one image frame obtained through the image sensor as a preview image. For example, the one or more processors may receive a request related to the start of photography, and corresponding to the received request, the one or more processors may display a UI of a photography application through the display. The UI of the photography application may include a first icon 1501 related to execution of the high speed photography mode and a second icon 1505 related to the start of recording. While displaying, through the display, the UI of the photography application, the one or more processors may display, through the display, image frames read out from the image sensor as a preview image 1510.

Further, the one or more processors may receive a user input related to setting a fixed ROI through the touchpad of the display or an input/output interface (e.g., 150) provided in the electronic device 1500. For example, the one or more processors may display, through the display, the preview image 1510, and the one or more processors may receive, through the touchpad, a user input for at least portion of the displayed preview image. In other words, upon receiving a user input to at least part of the preview image 1510 through the touchpad, with the preview image 1510 displayed through the display, the one or more processors may identify the at least port as a fixed ROI 1520. The one or more processors may display the region corresponding to the identified ROI 1520, in any shape (e.g., a rectangle), on the preview image.

Meanwhile, the one or more processors may use a sensor module (e.g., 240) provided in the electronic device, to likewise display the shape corresponding to the fixed ROI 1520 also on image frames newly obtained through the image sensor. For example, the one or more processors may detect a motion of the electronic device using at least one of a gyro sensor (e.g., 240B) or an acceleration sensor (e.g., 240E). The one or more processors may trace the ROI 1520 to display likewise the shape corresponding to the ROI 1520 also on newly obtained image frames based on a result of detecting the motion of the electronic device.

Referring to FIG. 15B, the processor may display a portable region of interest (ROI) 1540 on a plurality of image frames obtained through the image sensor.

According to an embodiment of the present disclosure, the one or more processors may display, on the display, at least one image frame obtained through the image sensor as a preview image. The one or more processors may receive a request related to the start of photography, and corresponding to the received request, the one or more processors may display a UI of a photography application through the display. For example, the UI of the photography application may include a first icon 1501 related to execution of the high speed photography mode and a second icon 1505 related to the start of recording. While displaying, through the display, the UI of the photography application, the one or more processors may display, through the display, image frames read out from the image sensor as a preview image 1530.

Further, the one or more processors may receive a user input related to setting a portable ROI through the touchpad of the display or an input/output interface (e.g., 150) provided in the electronic device 1500. For example, the one or more processors may display the preview image 1530 through the display. The one or more processors may identify a user input corresponding to at least one external object among external objects included in the preview image displayed on the display. For example, where a user input corresponding to at least one of the external objects included in the preview image is received for a preset time or more, the one or more processors may identify the external object for which the user input is received as the portable ROI 1540. The one or more processors may display the region corresponding to the identified ROI 1540, in any shape (e.g., a rectangle), on the preview image.

Meanwhile, the one or more processors may analyze the shape of the external object identified as the portable ROI 1540 to identify the external object identified as the portable ROI 1540 also from image frames newly obtained through the image sensor. For example, the one or more processors may analyze the shape of the external object through edge detection for the external object identified as the portable ROI 1540, and the one or more processors may identify and trace the same external object in the image frames newly obtained through the image sensor based on a result of the analysis.

Figure 16:
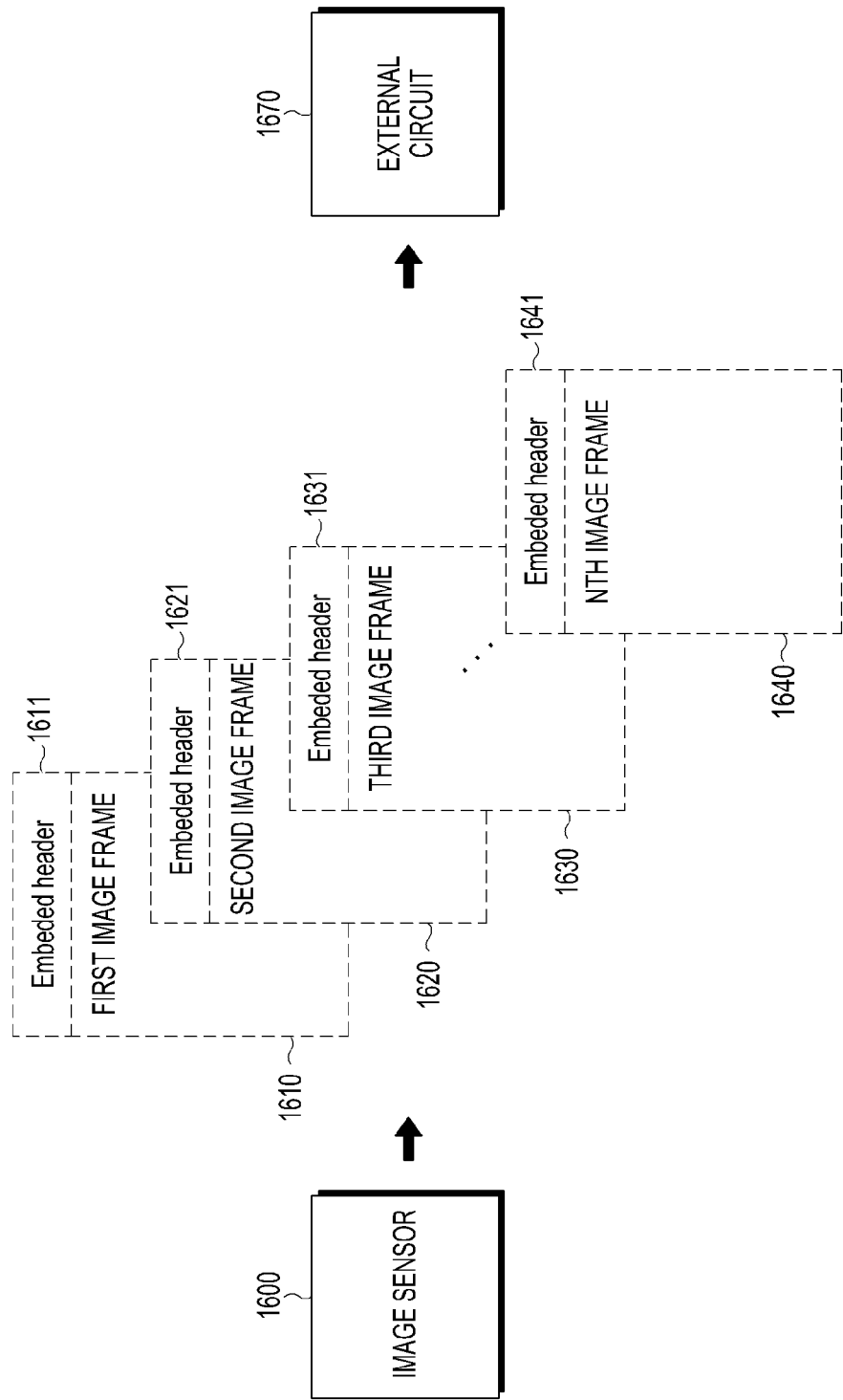
FIG. 16 illustrates a view of a method for differentiating between a plurality of image frames output from an image sensor according to an embodiment of the present disclosure.
Figure 17A:
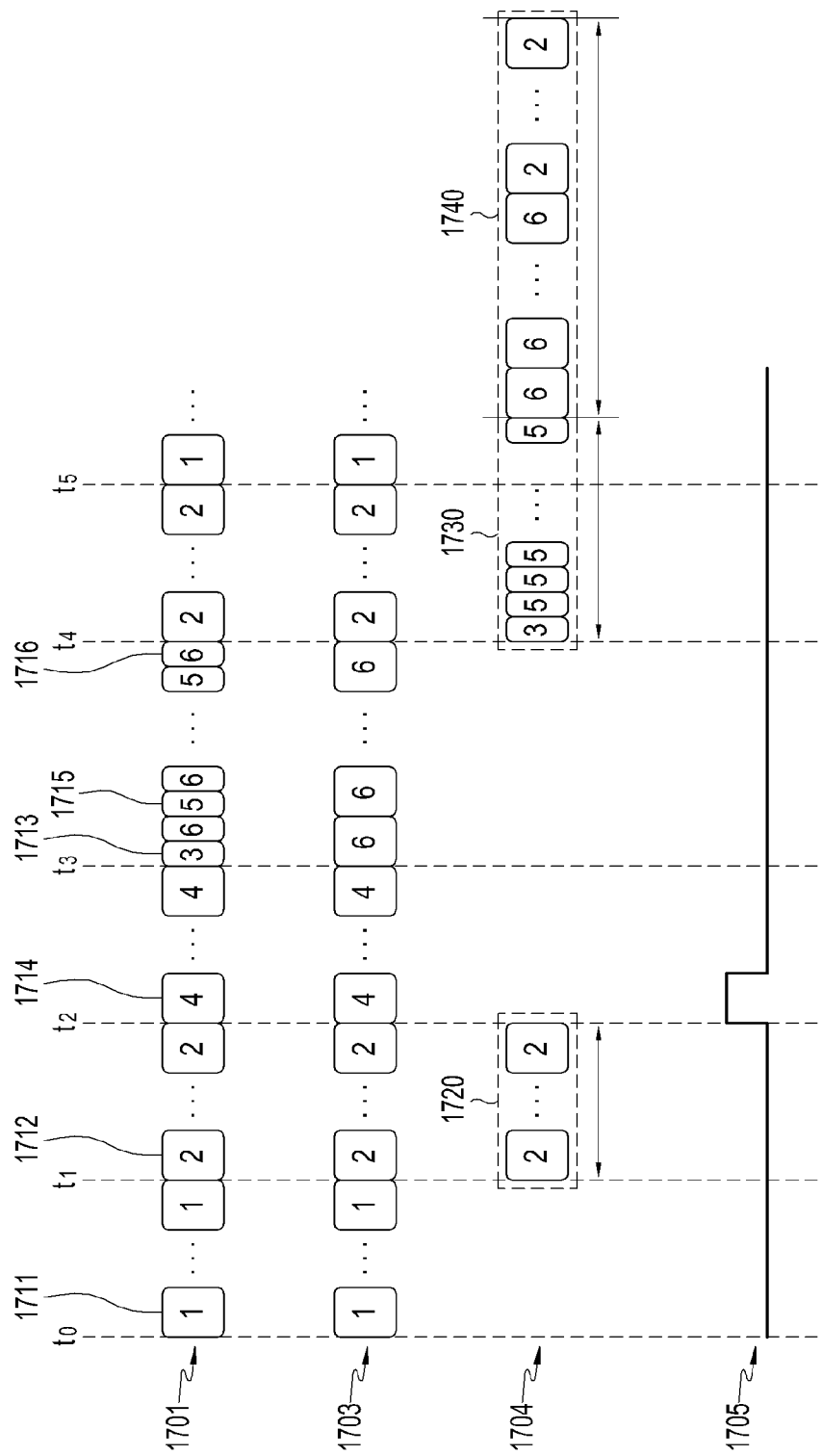
FIGS. 17A and 17B illustrate views of, over time, a method for differentiating between a plurality of image frames output from an image sensor according to an embodiment of the present disclosure.
Figure 17B:
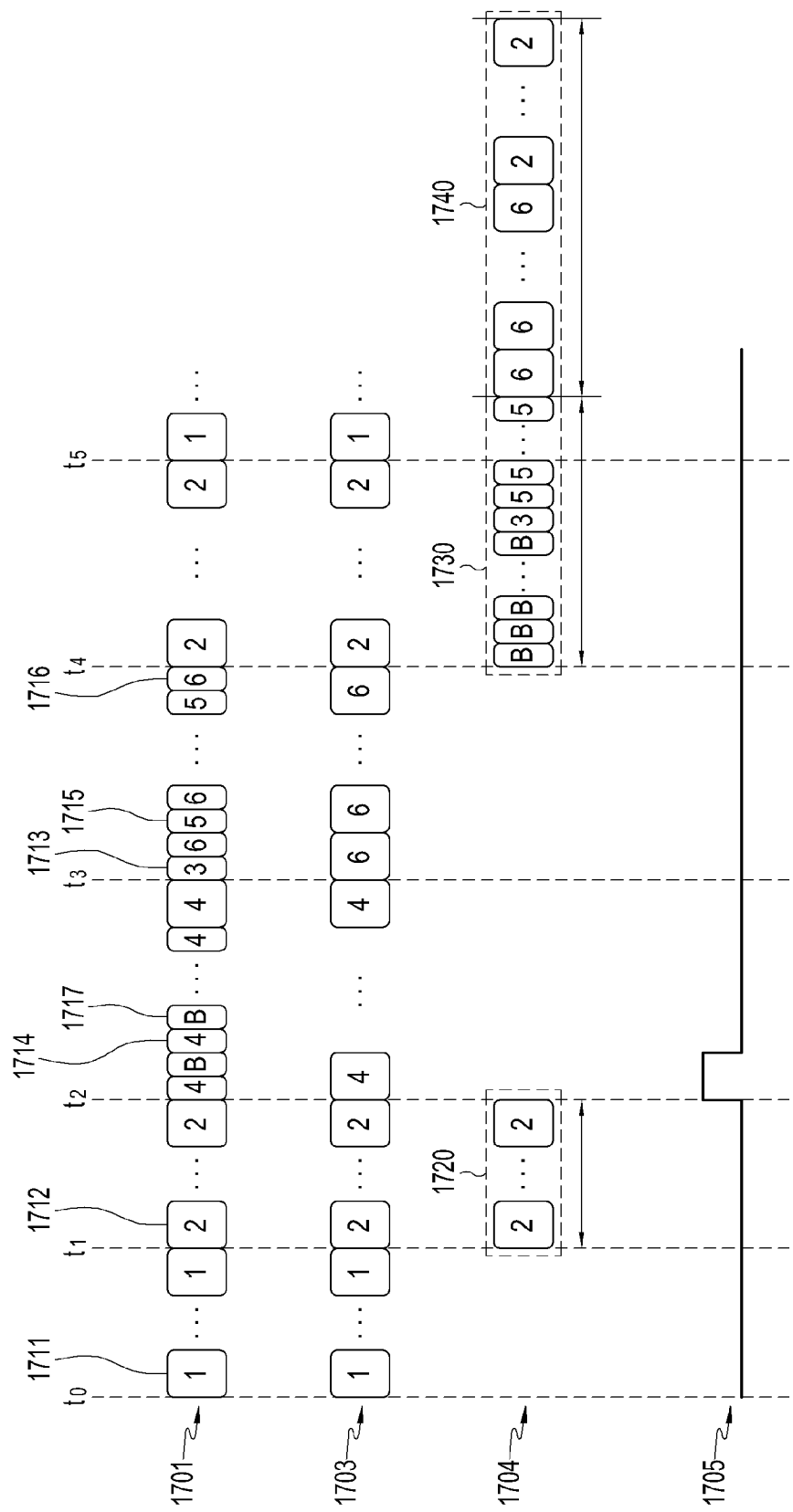

FIGS. 16, 17A, and 17B are views illustrating a method for identifying a plurality of image frames output from an image sensor according to an embodiment of the present disclosure.

FIG. 16 illustrates a view of a method for differentiating between a plurality of image frames output from an image sensor according to an embodiment of the present disclosure.

According to an embodiment of the present disclosure, the electronic device may include an image sensor 1600 and an external circuit 1670 connected with the image sensor. The external circuit 1670 may include the whole or part of the external circuit 570 of FIG. 5. For example, the external circuit 1670 may include a processor.

The image sensor 1600 of the electronic device may read out a plurality of image frames corresponding to light by a pixel array (e.g., 310). A plurality of image frames read out through the column-readout circuit (e.g., 330) of the image sensor 1600 may be delivered through the interface (e.g., 360) of the image sensor 1600 to the external circuit 1670. For example, the image sensor 1600 may connect with the external circuit 1670 through the interface, e.g., an interface as defined as per the MIPI protocol. The processor may receive one or more of the plurality of image frames, e.g., at the cycle of $1/240$ seconds (i.e., 240 fps), depending on the output speed of the interface. The processor may store, in the memory, some of the image frames received at 240 fps from the interface of the image sensor, and the processor may output the other image frames through the display at 120 fps. The processor may display, through the display, all or some of the image frames output at 120 fps, as preview images.

Meanwhile, upon obtaining a plurality of image frames 1610, 1620, 1630, and 1640 output through the interface of the image sensor 1600, the one or more processors may also obtain pieces of information 1611, 1621, 1631, and 1641 corresponding to the image frames. For example, first information 1611 corresponding to the first image frame 1610 may contain information corresponding to, e.g., the read-out speed and the time of obtaining the first image frame 1610. The one or more processors may obtain, along with the first image frame 1610, the first information 1611 having a separate embedded header/footer format distinct from pixel data corresponding to the first image frame 1610. In such a way, the one or more processors may obtain second information 1621 corresponding to the second image frame 1620, third information 1631 corresponding to the third image frame 1630, or Nth information 1641 corresponding to the Nth image frame 1640. The one or more processors may identify the time or order of obtaining the plurality of image frames output from the image sensor 1600 based on the obtained first information 1611 to Nth information 1641.

According to an embodiment of the present disclosure, when generating at least one video corresponding to receiving a request related to the end of recording as indicated in operation 790 of FIG. 7 and operation 1090 of FIG. 10, the one or more processors may identify the order of encoding for the plurality of image frames based on the obtained first information 1611 to Nth information 1641.

Further, in performing the embodiments of FIGS. 10 to 12, the one or more processors may delete, from the memory, image frames overlapping the image frames 1210 stored in the buffer memory among the image frames obtained at substantially 120 fps based on the obtained first information 1611 to Nth information 1641. In performing the embodiments of FIGS. 10 to 12, the one or more processors may pause or resume storing, in the memory, at least some of the image frames read out based on at least one of the obtained first information 1611 to Nth information 1641. For example, the one or more processors may pause or resume encoding to generate a video based on at least one of the obtained first information 1611 to Nth information 1641.

FIG. 17A illustrates a view of, over time, a method for differentiating between a plurality of image frames output from an image sensor according to an embodiment of the present disclosure.

FIG. 17A illustrates, over time, a first graph 1701 indicating image frames output from an image sensor, a second graph 1703 indicating image frames displayed through a display as preview images, a third graph 1704 indicating image frames encoded through an encoder, and a fourth graph 1705 indicating signals output through at least one interface (e.g., general port input/output (GPIO)). Meanwhile, a first plurality of image frames 1711 to a sixth plurality of image frames 1716 may be ones obtained by classifying a plurality of image frames based on at least one of the read-out speed of the plurality of image frames and the output times of the image frames from the image sensor.

According to an embodiment of the present disclosure, t0 may mean the time when photography begins. For example, t0 is the time when a photography application is executed by the user of the electronic device.

t1 may mean the time when recording starts. For example, one or more processors (e.g., 120, 210, or 340) of the electronic device may receive a signal related to the start of recording at t1.

t2 may mean the time when a variation associated with an external object occurs. For example, the one or more processors of the electronic device may detect the variation associated with the external object at t2.

t3 may mean the time when a preset event occurs. For example, t3 may mean the time when the storage of the memory (e.g., 350) inside the image sensor (e.g., 300) of the electronic device is full. Besides, the preset event may include when no further variation associated with the external object is detected. The preset event may include when a preset time elapses. The preset event may include when a signal related to ending high speed photography is received from the outside.

t4 may mean the time when all of the plurality of image frames stored in the memory (e.g., 350) inside the image sensor of the electronic device are completely output from the image sensor. For example, the one or more processors of the electronic device may obtain, at t4, the last image frame stored among the plurality of image frames stored in the memory (e.g., 350) between t2 and t3.

t5 may mean the time when recording ends. For example, the one or more processors of the electronic device may receive a signal related to the end of recording at t5.

According to an embodiment of the present disclosure, a first plurality of image frames 1711 may mean image frames output from the image sensor between t0 and t1 or after t5. For example, the first plurality of image frames 1711 may be image frames output from the image sensor between t0 and t1 or after t5, and the image frames may be displayed at a first frame rate (e.g., 30 fps) through the display.

A second plurality of image frames 1712 may mean image frames output from the image sensor between t1 and t2, and the image frames may be output from the image sensor at a second frame rate (e.g., 120 fps). The second plurality of image frames 1712 may also mean image frames output from the image sensor between t4 and t5, and the image frames may be output from the image sensor at a second frame rate (e.g., 120 fps). The one or more processors of the electronic device may display, at the first frame rate (e.g., 30 fps) through the display as preview images, at least some of the second plurality of image frames 1712 output from the image sensor between t1 and t2 or between t4 and t5.

A third interface 360 1713 may mean an image frame obtained at t2 when a variation associated with an external object is detected.

A fourth plurality of image frames 1714 may mean image frames output from the image sensor between t2 and t3, and the image frames may be output from the image sensor at a second frame rate (e.g., 120 fps). The one or more processors of the electronic device may display, at the first frame rate (e.g., 30 fps) through the display as preview images, at least some of the fourth plurality of image frames 1714 output from the image sensor between t2 and t3. Meanwhile, the fourth plurality of image frames 1714 may be used only for preview image purposes, and may not be output in other embodiments.

A fifth plurality of image frames 1715 may mean image frames read out at a third frame rate (e.g., 960 fps) through the column-readout circuit (e.g., 330) provided in the image sensor between t2 and t3, along with the third image frame 1713. In other words, the fifth plurality of image frames 1715 may mean image frames stored in the memory provided in the image sensor between t2 and t3, together with the third image frame 1713. According to an embodiment of the present disclosure, as many fifth image frames 1715 as the storage of the memory provided in the image sensor may be stored.

A sixth plurality of image frames 1716 may mean image frames output from the image sensor between t3 and t4, and the image frames may be output from the image sensor at a second frame rate (e.g., 120 fps).

According to an embodiment of the present disclosure, the one or more processors may obtain the first plurality of image frames output at the second frame rate (e.g., 120 fps or 30 fps) from the image sensor before t1 when the signal related to the start of recording is received. The one or more processors may display, at the first frame rate (e.g., 30 fps) through the display, the first plurality of image frames 1711 obtained at the second frame rate (e.g., 120 fps), as preview images.

The one or more processors may obtain the second plurality of image frames 1712 output at the second frame rate (e.g., 120 fps) from the image sensor between t1 when the signal related to the start of recording is received and t2 when the variation associated with the external object is detected. The one or more processors may store, in the memory (e.g., 130) at least some of the second plurality of image frames 1712 obtained at the second frame rate (e.g., 120 fps), and the one or more processors may perform encoding to generate a video using the image frames stored in the memory (e.g., 130). For example, the one or more processors may generate a first portion 1720 of the video using at least some of the second plurality of image frames 1712 obtained at the second frame rate (e.g., 120 fps). Further, the one or more processors may display, at the first frame rate (e.g., 30 fps) through the display, at least some of the second plurality of image frames 1712 obtained at the second frame rate (e.g., 120 fps), as preview images. Meanwhile, the one or more processors may stop encoding to generate a video based on at least one signal received at t2 when the variation associated with the external object is detected. For example, referring to the fourth graph 1705, the one or more processors may pause encoding for generating a video based on the signal output at t2 from at least one interface (e.g., GPIO) corresponding to the variation associated with the external object.

The one or more processors may obtain the fourth plurality of image frames 1714 output at the second frame rate (e.g., 120 fps) from the image sensor between t2 when the variation associated with the external object is detected and t3 when a preset event occurs. Meanwhile, the one or more processors may store, in the memory provided in the image sensor, the third image frame 1713 or the fifth plurality of image frames 1715 read out at the third frame rate (e.g., 960 fps) through the column-readout circuit provided in the image sensor between t2 and t3.

The one or more processors may obtain the third image frame 1713, the fifth plurality of image frames 1715, and the sixth plurality of image frames 1716 output at the second frame rate (e.g., 120 fps) from the image sensor between t3 when the preset event occurs and t4 when all of the plurality of image frames stored in the memory of the image sensor are completely output. The one or more processors may store, in the memory (e.g., 130), the third image frame 1713, the fifth plurality of image frames 1715, and the sixth plurality of image frames 1716 obtained at the second frame rate (e.g., 120 fps) from the image sensor. The one or more processors may display, at the first frame rate (e.g., 30 fps) through the display, the sixth plurality of image frames 1716 obtained at the second frame rate (e.g., 120 fps) from the image sensor, as preview images.

The one or more processors may obtain the second plurality of image frames 1712 output at the second frame rate (e.g., 120 fps) from the image sensor between t4 when all of the plurality of image frames stored in the memory of the image sensor are completely output and t5 when a signal related to the end of recording is received. The one or more processors may store, in the memory (e.g., 130), the second plurality of image frames 1712 obtained at the second frame rate (e.g., 120 fps) from the image sensor. The one or more processors may display, at the first frame rate (e.g., 30 fps) through the display, the second plurality of image frames 1712 obtained at the second frame rate (e.g., 120 fps) from the image sensor, as preview images.

The one or more processors may obtain the first plurality of image frames 1711 output at the second frame rate (e.g., 120 fps or 30 fps) from the image sensor after t5 when the signal related to the end of recording is received. The one or more processors may display, at the first frame rate (e.g., 30 fps) through the display, the first plurality of image frames 1711 obtained at the second frame rate (e.g., 120 fps or 30 fps), as preview images.

According to an embodiment of the present disclosure, the one or more processors may resume the encoding to generate a video using the image frames stored in the memory (e.g., 130) from t4 when all of the image frames stored in the memory provided in the image sensor are completely output from the image sensor. For example, the one or more processors may generate a second portion 1730 of the video using the fifth plurality of image frames 1715 and the third image frame 1713 stored in the memory (e.g., 130). The one or more processors may generate a third portion 1740 of the video using the second plurality of image frames 1712 and the sixth plurality of image frames 1716 stored in the memory (e.g., 130).

According to an embodiment of the present disclosure, the one or more processors may determine the order of encoding the third image frame 1713, the fifth plurality of image frames 1715, the sixth plurality of image frames 1716, and the second plurality of image frames 1712 stored in the memory (e.g., 130) based on at least one piece of information included in each image frame. For example, referring to FIG. 16, upon obtaining a plurality of image frames 1610, 1620, 1630, and 1640 output through the interface of the image sensor, the one or more processors may also obtain pieces of information 1611, 1621, 1631, and 1641 corresponding to the image frames. For example, first information 1611 corresponding to the first image frame 1610 may contain information corresponding to, e.g., the time when the first interactive map frame 1610 is read out, the read-out speed, and the time when the first interactive map frame 1610 is output from the image sensor. The one or more processors may obtain, along with the first image frame 1610, the first information 1611 having a separate embedded header/footer format distinct from pixel data corresponding to the first image frame 1610. In such a way, the one or more processors may also obtain the first information to sixth information respectively corresponding to the first plurality of image frames 1711 to the sixth plurality of image frames 1716. The one or more processors may identify the time or order of obtaining the first plurality of image frames 1711 to the sixth plurality of image frames 1716 from the image sensor based on the obtained first information to sixth information.

Meanwhile, the first frame rate, the second frame rate, or the third frame rate used in the above embodiments may be varied depending on the settings of the electronic device or interface performance, and they may be the same or different from each other.

FIG. 17B illustrates a view of, over time, a method for differentiating between a plurality of image frames output from an image sensor according to an embodiment of the present disclosure.

According to an embodiment of the present disclosure, one or more processors may store, in the memory (e.g., 350) provided in the image sensor, the Bth image frames 1717 corresponding to some of a plurality of image frames read out at the third frame rate (e.g., 960 fps) through the column-readout circuit (e.g., 330) provided inside the image sensor between t1 when a signal related to the start of recording is received and t2 when a variation associated with an external object is detected.

For example, the one or more processors (e.g., 340) may store, in the memory provided inside the image sensor, N image frames read out latest among a plurality of image frames read out at the third frame rate (e.g., 960 fps). In other words, the one or more processors may store, in the memory (e.g., 350) provided inside the image sensor, the Bth image frames 1717 corresponding to some of the plurality of image frames read out at the third frame rate (e.g., 960 fps) in an update type (so that image frames recently read out are stored) until a variation associated with the external object occurs. N may be a non-zero integer preset by the user.

The one or more processors (e.g., 120) may obtain the fourth plurality of image frames 1714 and the Bth image frames 1717 output at the second frame rate (e.g., 120 fps) from the image sensor between t2 when the variation associated with the external object is detected and t3 when a preset event occurs. For example, the Bth image frames 1717 may be image frames read out latest at the third frame rate (e.g., 960 fps) with respect to t2 when the variation associated with the external object is detected and stored in the memory (e.g., 350). The one or more processors may store, in the memory (e.g., 130), the Bth image frames 1717 obtained at the second frame rate (e.g., 120 fps) from the image sensor. The one or more processors may display, at the first frame rate (e.g., 30 fps) through the display, the fourth plurality of image frames 1714 obtained at the second frame rate (e.g., 120 fps) from the image sensor, as preview images. Meanwhile, the one or more processors may store, in the memory (e.g., 350) provided in the image sensor, the third image frame 1713 or the fifth plurality of image frames 1715 read out at the third frame rate (e.g., 960 fps) through the column-readout circuit provided in the image sensor between t2 and t3.

According to an embodiment of the present disclosure, the one or more processors may resume the encoding to generate a video using the image frames stored in the memory (e.g., 130) from t4 when all of the image frames stored in the memory provided in the image sensor are completely output from the image sensor. For example, the one or more processors may generate a second portion 1730 of the video using the Bth image frames 1717, the fifth plurality of image frames 1715 and the third image frame 1713 stored in the memory (e.g., 130). The one or more processors may generate a third portion 1740 of the video using the second plurality of image frames 1712 and the sixth plurality of image frames 1716 stored in the memory (e.g., 130).

According to an embodiment of the present disclosure, the one or more processors (e.g., 120) may obtain the Bth image frames 1717 between t3 and t4, but not between t2 and t3. In this case, the one or more processors may obtain the Bth image frames 1717, the third image frame 1713, the fifth plurality of image frames 1715, and the sixth plurality of image frames 1716 output at the second frame rate (e.g., 120 fps) from the image sensor between t3 when the preset event occurs and t4 when all of the plurality of image frames stored in the memory of the image sensor are completely output.

Meanwhile, the first frame rate, the second frame rate, or the third frame rate used in the above embodiments may be varied depending on the settings of the electronic device or interface performance, and they may be the same or different from each other.

Figure 18:
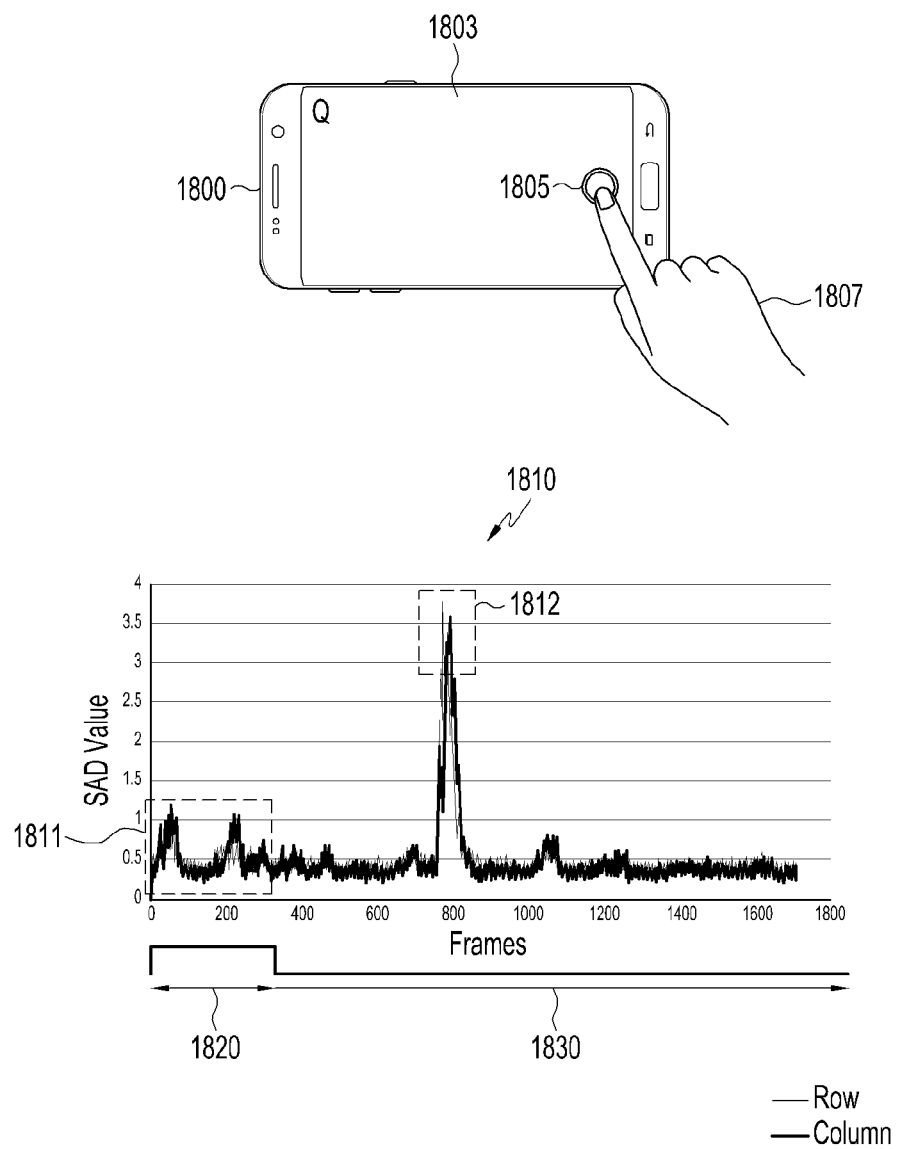
FIGS. 18 and 19 illustrate views of a method for masking a distorted portion in performing high speed photography using an electronic device according to an embodiment of the present disclosure.
Figure 19:
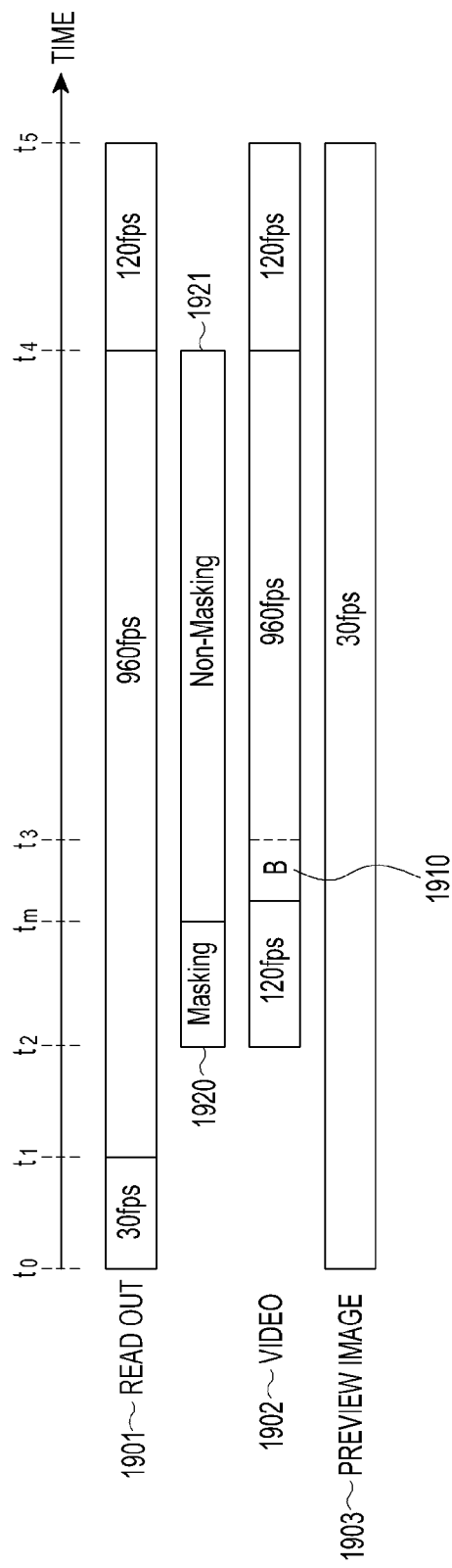

FIGS. 18 and 19 are views illustrating a method for masking a distorted portion in performing high speed photography using an electronic device according to an embodiment of the present disclosure.

In an electronic device (e.g., 101 or 201) including one or more processors, an image sensor, and a display, the one or more processors may be the entity to perform the method. The image sensor may include the whole or part of the image sensor 300 of FIG. 3. One or more processors may include the controller (e.g., 340) or processor (e.g., 510) included in the image sensor.

FIG. 18 illustrates a graph 1810 used to detect a variation associated with an external object and an electronic device 1800 according to an embodiment of the present disclosure. The x axis of the graph 1810 denotes a plurality of image frames obtained through an image sensor, and the y axis denotes differences in brightness between each of the plurality of image frames and an image frame for comparison.

One or more processors of the electronic device 1800 may receive a request related to the start of photography, and corresponding to the received request, the one or more processors may display a UI of a photography application through the display 1803. The UI of the photography application may include an icon 1805 related to the start of recording. The one or more processors may start recording upon receiving the user 1807's touch input to the icon 1805 displayed on the display 1803.

Meanwhile, the one or more processors may detect a variation associated with the external object using at least two image frames among a plurality of image frames obtained through the image sensor. For example, the one or more processors may select a first image frame and a second image frame among the plurality of image frames obtained through the image sensor. Where a difference between a first brightness of the selected first image frame and a second brightness of the selected second image frame exceeds a preset threshold, the one or more processors may determine that the variation associated with the external object has occurred between the time when the first image frame was obtained and the time when the second image frame was obtained. For example, where the difference between a first brightness of the selected first image frame and a second brightness of the selected second image frame has a large value as indicated in a second portion 1812 of the graph 1810, the processor may determine that the variation associated with the external object is detected.

The graph 1810 may include noise as indicated in the first portion 1811, which may be caused by a vibration of the electronic device 1800 generated when the user 1807's touch input is received through the icon 1805 displayed on the display 1803. In other words, noise indicated in the first portion 1811 of the graph 1810 may be generated based on the vibration of the electronic device 1800. The one or more processors may abstain from detecting variations associated with the external object for a first time 1820 after a request related to manual high speed photography or receiving a request related to the start of recording, so as to remove or reduce noise as indicated in the first portion 1811. In other words, the processor may mask all types of signals received for the first time 1820. Accordingly, the one or more processors may detect a variation associated with the external object for a second time 1830 which comes after the first time 1820.

According to an embodiment of the present disclosure, the one or more processors may adjust a threshold used to determine whether the external object is varied in the environment where the electronic device is positioned. For example, upon determining that lots of noise is caused as the electronic device is in the dark environment or as the user of the electronic device shakes his hand, the one or more processors may lower the threshold which is a reference for determining whether the external object is varied. When the threshold, as the reference to determine whether the external object is varied, is lowered, the sensitivity of the one or more processors may be enhanced.

Like FIG. 9, FIG. 19 illustrates a first graph 1901 indicating the read-out speed varying over time, a second graph 1902 indicating the speed at which image frames constituting a video are obtained, and a third graph 1903 indicating the output speed of preview images displayed through a display.

According to an embodiment of the present disclosure, one or more processors may receive a request related to the start of photography at t0. The one or more processors may receive a request related to execution of the high speed photography mode at t1. The one or more processors may receive a request related to the start of recording at t2. Meanwhile, when a touch input of the user (e.g., 1807) is received through the icon (e.g., 1805) displayed on the display (e.g., 1803), the one or more processors may start recording. Upon receiving the user's touch input through the display of the electronic device, the electronic device may be shaken. The one or more processors may set a period between t2 when the user's touch input is received and tm after t2 as a masking period 1920, to remove or reduce noise due to the shake of the electronic device which may occur due to the user's touch input. For example, the one or more processors may disregard all signals received during the masking period 1920.

The one or more processors may detect a variation associated with the external object from tm when the masking period 1920 ends. For example, the one or more processors may detect a variation associated with the external object by comparing at least two image frames among image frames obtained during a non-masking period 1921.

The one or more processors may detect a variation associated with an external object at t3. Corresponding to the variation associated with the external object detected at t3, the one or more processors may store all of the image frames read out at 960 fps in the memory (e.g., 350) provided in the image sensor. In other words, the one or more processors may have such an effect as if the image frames read out at 960 fps are obtained at 960 fps by storing all of the image frames read out at 960 fps in the memory. For example, the one or more processors may generate a 960 fps video using the image frames stored in the memory. The one or more processors may delete, from the memory, image frames overlapping the image frames 1210 stored in the buffer memory among the image frames obtained at substantially 120 fps. After the overlapping image frames are completely deleted, the one or more processors may store, in the memory, the N image frames 1910 stored in the buffer memory.

The processor may determine that the variation associated with the external object stops at t4, and the processor may receive a request related to the end of recording at t5.

Figure 20:
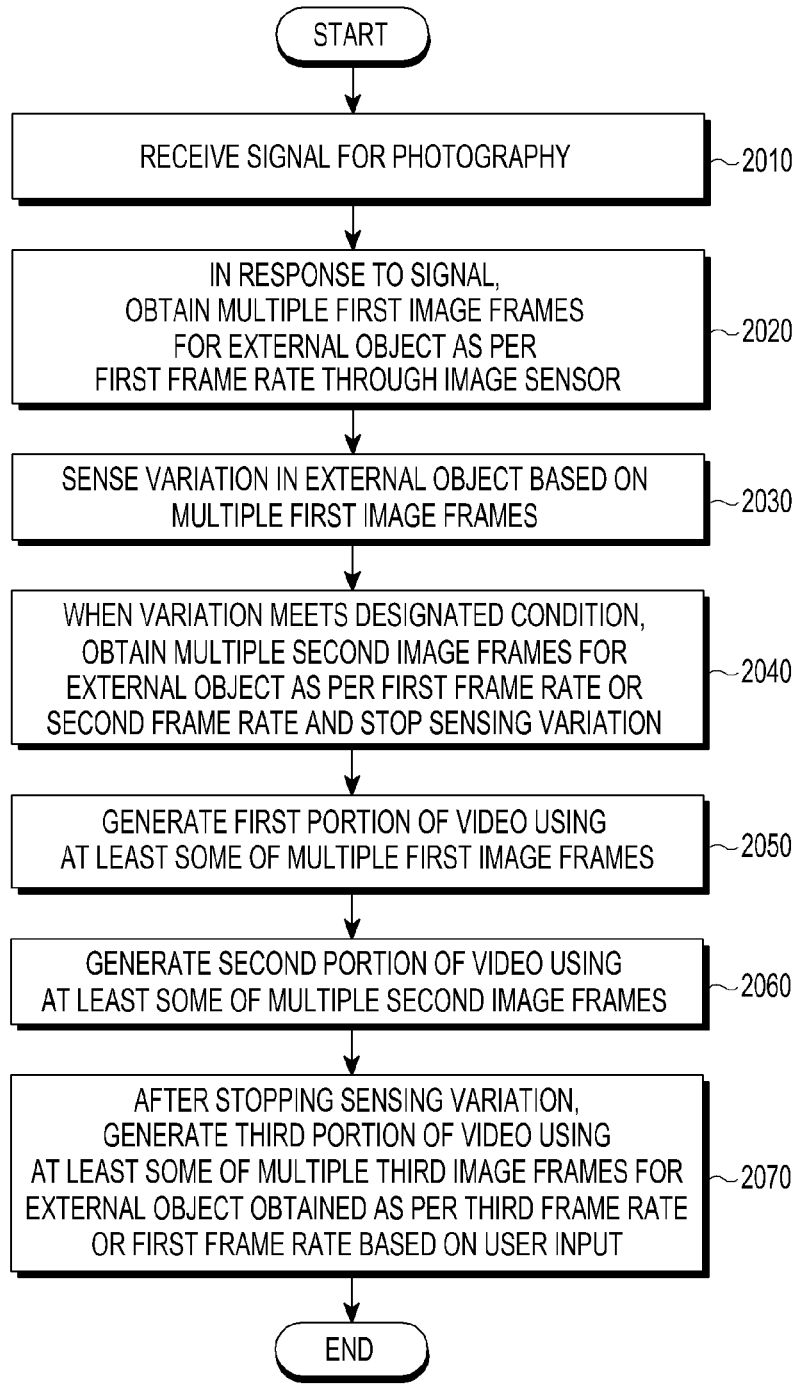
FIG. 20 illustrates a flowchart of a method for performing high speed photography multiple times using an electronic device according to an embodiment of the present disclosure.

FIG. 20 illustrates a flowchart illustrating a method for performing high speed photography multiple times using an electronic device according to an embodiment of the present disclosure.

In an electronic device (e.g., 101 or 201) including one or more processors, an image sensor, and a display, the one or more processors may be the entity to perform the method. The image sensor may include the whole or part of the image sensor 300 of FIG. 3. One or more processors may include the controller (e.g., 340) or processor (e.g., 510) included in the image sensor.

Referring to FIG. 20, in operation 2010, the processor may receive a signal for photography. For example, one or more processors may receive a request related to execution of a photography application and start of recording from the user of the electronic device through an input/output interface (e.g., 150) provided in the electronic device.

In operation 2020, the one or more processors may obtain a first plurality of image frames for the external object as per a first frame rate (e.g., 960 fps or 120 fps) through the image sensor in response to the received signal. For example, the one or more processors may obtain the first plurality of image frames read out at 960 fps or 120 fps through the column-readout circuit in response to the received signal.

In operation 2030, the one or more processors may detect a variation associated with the external object based on the first plurality of image frames. For example, the one or more processors may select a first image frame and a second image frame among the first plurality of image frames. Where a difference between a first brightness of the selected first image frame and a second brightness of the selected second image frame exceeds a preset threshold, the one or more processors may determine that the variation associated with the external object has occurred between the time when the first image frame was obtained and the time when the second image frame was obtained. Upon determining that the external object is varied between the time of obtaining the first image frame and the time of obtaining the second image frame, the one or more processors may determine that the variation associated with the external object meets a designated condition.

In operation 2040, when the variation meets the designated condition, the one or more processors may obtain the second plurality of image frames for the external object as per the first frame rate or second frame rate. Where the variation meets the designated condition, the one or more processors may stop detecting variations associated with the external object. For example, upon detecting a variation associated with the external object, the one or more processors may start automatic high speed photography. When the automatic high speed photography starts, the one or more processors may store, in the memory, all of the image frames read out at the first frame rate or second frame rate. For example, the one or more processors may have such an effect as if the plurality of image frames read out at 960 fps are obtained at 960 fps by storing all of the image frames read out at 960 fps in the memory.

According to an embodiment of the present disclosure, the first frame rate which is the speed at which the first plurality of image frames are read out may be set as 960 fps. In this case, the second frame rate which is the speed at which the second plurality of image frames are read out may be set as 960 fps or 1000 fps.

The first frame rate which is the speed at which the first plurality of image frames are read out may be set as 120 fps. In this case, the second frame rate which is the speed at which the second plurality of image frames are read out may be set as 120 fps or 960 fps.

Meanwhile, the automatic high speed photography which starts corresponding to the variation meeting the designated condition may be ended where a preset event occurs. For example, the preset event may include when the storage of the memory inside the image sensor is full. The preset event may include when no further variation associated with the external object is detected. The preset event may include when a preset time elapses. The preset event may include when a signal related to ending high speed photography is received from the outside.

For example, the moment that the storage of the memory in the image sensor is full, the one or more processors may determine that the memory in the image sensor can store no more image frames. Accordingly, the one or more processors may set the read-out speed to be lower than the read-out speed currently set, and the one or more processors may end the automatic high speed photography.

In operation 2050, the one or more processors may generate a first portion of a video using at least some of the first plurality of image frames obtained at the first frame rate. For example, when the first frame rate is 120 fps, the one or more processors may generate a 120 fps video using at least some of the first plurality of image frames read out at 120 fps. The first plurality of image frames are image frames read out at 120 fps. The one or more processors may obtain, in real-time, the first plurality of image frames through the interface having an output speed of 120 fps or more, without storing the first plurality of image frames in the memory of the image sensor.

Meanwhile, where the first frame rate is 960 fps, the one or more processors may generate a 120 fps video by selecting, and obtaining, in the ration of 1:8, some of the first plurality of image frames read out at 960 fps. For example, the one or more processors may obtain one out of every eight image frames read out at 960 fps, and thus, the one or more processors may obtain the same image frames as image frames read out at substantially 120 fps.

In operation 2060, the one or more processors may generate a second portion of the video using at least some of the second plurality of image frames obtained at the second frame rate. For example, where the second frame rate is 960 fps, the one or more processors may store all of the second plurality of image frames read out at 960 fps in the memory provided in the image sensor. The one or more processors may generate a 960 fps video by obtaining the second plurality of image frames stored in the memory through the interface.

In operation 2070, after stopping detecting variations associated with external object, the one or more processors may generate a third portion of the video using at least some of the third plurality of image frames for the external object obtained at the first frame rate or third frame rate based on a user input. For example, where detecting variations associated with the external object is stopped in operation 2040, the one or more processors may receive a signal related to the start of manual high speed photography from the user of the electronic device. The one or more processors may start the manual high speed photography based on the received signal, and the one or more processors may set the read-out speed of the column-readout circuit as 960 fps, 1000 fps, 480 fps, or other various speeds.

Meanwhile, the manual high speed photography starting corresponding to the user's input may be ended when a preset event occurs. For example, the preset event may include when the storage of the memory inside the image sensor is full. The preset event may include when no further variation associated with the external object is detected. The preset event may include when a preset time elapses. The preset event may include when a signal related to ending high speed photography is received from the outside.

For example, the moment that the storage of the memory in the image sensor is full, the one or more processors may determine that the memory in the image sensor can store no more image frames. Accordingly, the one or more processors may set the read-out speed to be lower than the read-out speed currently set, and the one or more processors may end the manual high speed photography.

According to an embodiment of the present disclosure, the one or more processors may generate a first portion of the video based on at least some of the first plurality of image frames. The first portion may be a 120 fps video. The one or more processors may generate the second portion of the video based on the second plurality of image frames. The second portion may be a 960 fps video. The one or more processors may generate a third portion of the video based on at least some of the third plurality of image frames. The third portion may be a 960 fps video. For example, the video may include the first portion, the second portion, the first portion, the third portion, and the first portion in the order thereof.

Figure 21:
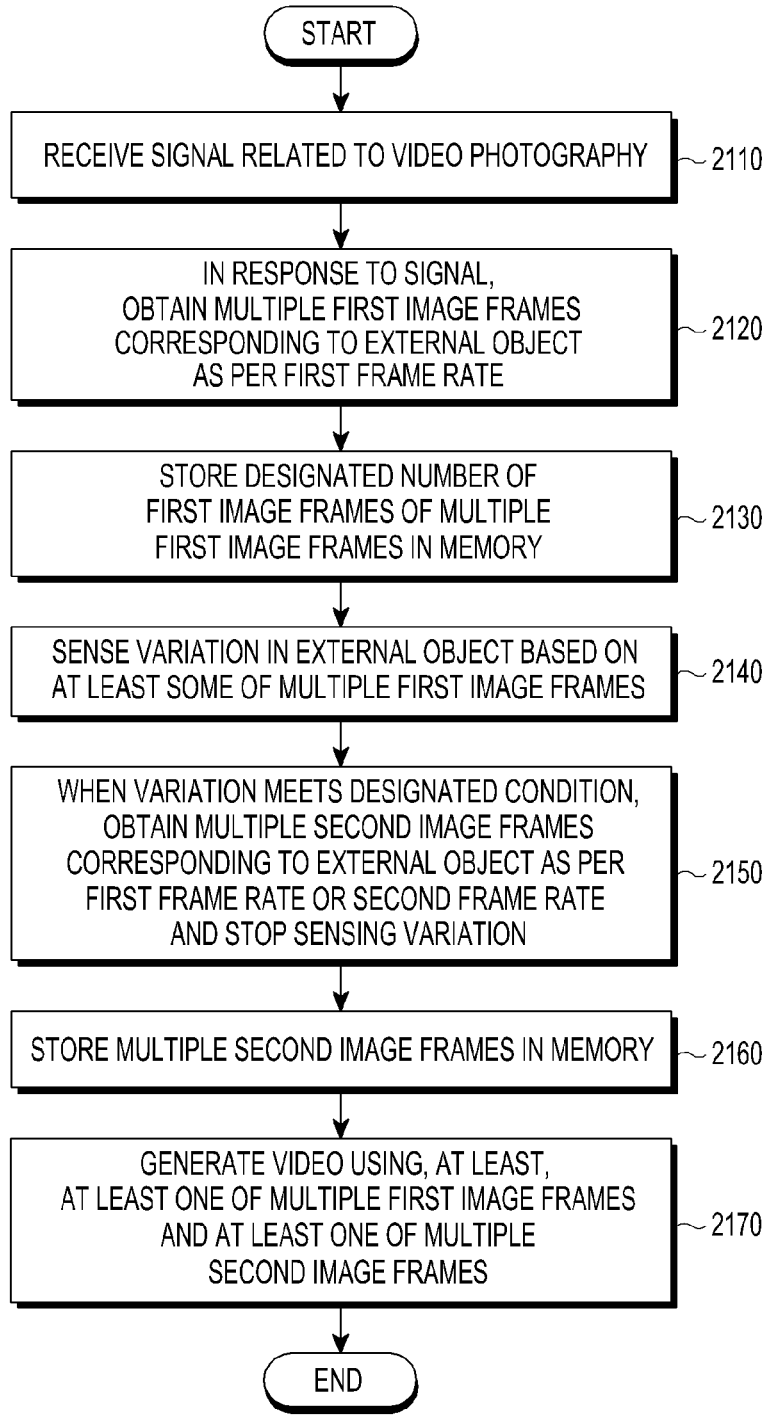
FIG. 21 illustrates a flowchart of a method for performing high speed photography using a buffer memory according to an embodiment of the present disclosure.

FIG. 21 illustrates a flowchart of a method for performing high speed photography using a buffer memory according to an embodiment of the present disclosure.

In an image sensor (e.g., 300) including a memory (e.g., 350), a controller (e.g., 340), and a read-out circuit (e.g., 330), the controller may be an entity that performs the method. Or, in an electronic device (e.g., 101 or 201) including the image sensor, a processor (e.g., 510), and a display (e.g., 160), the processor may be an entity that performs the method. For example, the controller 340 may be referred to as a first processor, and the processor 510 in the external circuit 370 may be referred to as a second processor.

Referring to FIG. 21, in operation 2110, the first processor may receive a signal related to video photography. For example, the first processor may receive a request for video photography from the user of the electronic device through an input/output interface (e.g., 150) provided in the electronic device. For example, the first processor may receive commands related to the execution of a program (e.g., 140) related to video photography and the start of video photography. The first processor may activate the image sensor corresponding to the execution of the video photography-related program and obtain, at, e.g., 30 fps, at least one image frame through the activated image sensor. The first processor may display, through the display, at least one image frame obtained at 30 fps, as a preview image.

In operation 2120, in response to the received signal, the first processor may obtain, as per a first frame rate (e.g., 960 fps), a first plurality of image frames corresponding to an external object. For example, the first processor may receive a request for high speed video photography from the user of the electronic device. Accordingly, the first processor may set the read-out speed as the first frame rate. The column-readout circuit 330 of the image sensor 300 may read out a plurality of image frames as per the first frame rate set by the processor based on light received by the pixel array 310.

In operation 2130, the first processor may store a designated number of image frames among the first plurality of image frames obtained in the memory. In this case, the memory may be a memory (e.g., 350) provided in the image sensor. For example, the first processor may store, in the buffer memory provided in the image sensor, N image frames read out latest among the plurality of image frames read out at 960 fps. Here, some first image frames may be image frames (e.g., 1111, 1210, and 1410) stored in the buffer memory at high speed.

Or, in selecting N image frames among the plurality of image frames read out at 960 fps, the first processor may select image frames obtained at predetermined intervals, but not image frames continuously obtained. For example, where N image frames are selected among the image frames continuously image frames and are stored in the memory, a 960 fps video may be generated, whereas when N image frames are selected among odd-numbered or even-numbered image frames and are stored in the memory, a 480 fps video may be generated.

In operation 2140, the first processor may detect a variation associated with the external object based on at least some of the first plurality of image frames. For example, the first processor may select a first image frame and a second image frame among the first plurality of image frames. Where a difference between a first brightness of the selected first image frame and a second brightness of the selected second image frame exceeds a preset threshold, the first processor may determine that the variation associated with the external object has occurred between the time when the first image frame was obtained and the time when the second image frame was obtained. Upon determining that the external object is varied between the time of obtaining the first image frame and the time of obtaining the second image frame, the first processor may determine that the variation associated with the external object meets a designated condition.

In operation 2150, when the variation meets the designated condition, the first processor may obtain the second plurality of image frames for the external object as per the first frame rate or second frame rate. Where the variation meets the designated condition, the first processor may stop detecting variations associated with the external object. Where the variation meets the designated condition, the first processor may store the second plurality of image frames in the memory provided in the image sensor. For example, upon detecting a variation associated with the external object, the first processor may start automatic high speed photography. When the automatic high speed photography starts, the first processor may store, in the memory, all of the image frames read out at the first frame rate or second frame rate. For example, the first processor may have such an effect as if the plurality of image frames read out at 960 fps are obtained at 960 fps by storing all of the image frames read out at 960 fps in the memory.

According to an embodiment of the present disclosure, the first frame rate which is the speed at which the first plurality of image frames are read out may be set as 960 fps. In this case, the second frame rate which is the speed at which the second plurality of image frames are read out may be set as 960 fps or 1000 fps.

The first frame rate which is the speed at which the first plurality of image frames are read out may be set as 120 fps. In this case, the second frame rate which is the speed at which the second plurality of image frames are read out may be set as 120 fps or 960 fps.

Meanwhile, the automatic high speed photography which starts corresponding to the variation meeting the designated condition may be ended where a preset event occurs. For example, the preset event may include when the storage of the memory inside the image sensor is full. The preset event may include when no further variation associated with the external object is detected. The preset event may include when a preset time elapses. The preset event may include when a signal related to ending high speed photography is received from the outside.

For example, the moment that the storage of the memory in the image sensor is full, the one or more processors may determine that the memory in the image sensor can store no more image frames. Accordingly, the one or more processors may set the read-out speed to be lower than the read-out speed currently set, and the one or more processors may end the automatic high speed photography.

In operation 2170, the second processor may generate a video, at least, using at least one of the first plurality of image frames and at least one of the second plurality of image frames. According to an embodiment of the present disclosure, the second processor may generate a first portion of the video based on at least some of the first plurality of image frames. The first portion may be a 120 fps video. The second processor may generate a second portion of the video based on the N first image frames stored and the second plurality of image frames in the memory 350. The second portion may be a 960 fps video. Meanwhile, the second processor may compare N first image frames stored in the memory and at least some of the first plurality of image frames, and when there are overlapping image frames, the second processor may delete one of the overlapping image frames.

Figure 22:
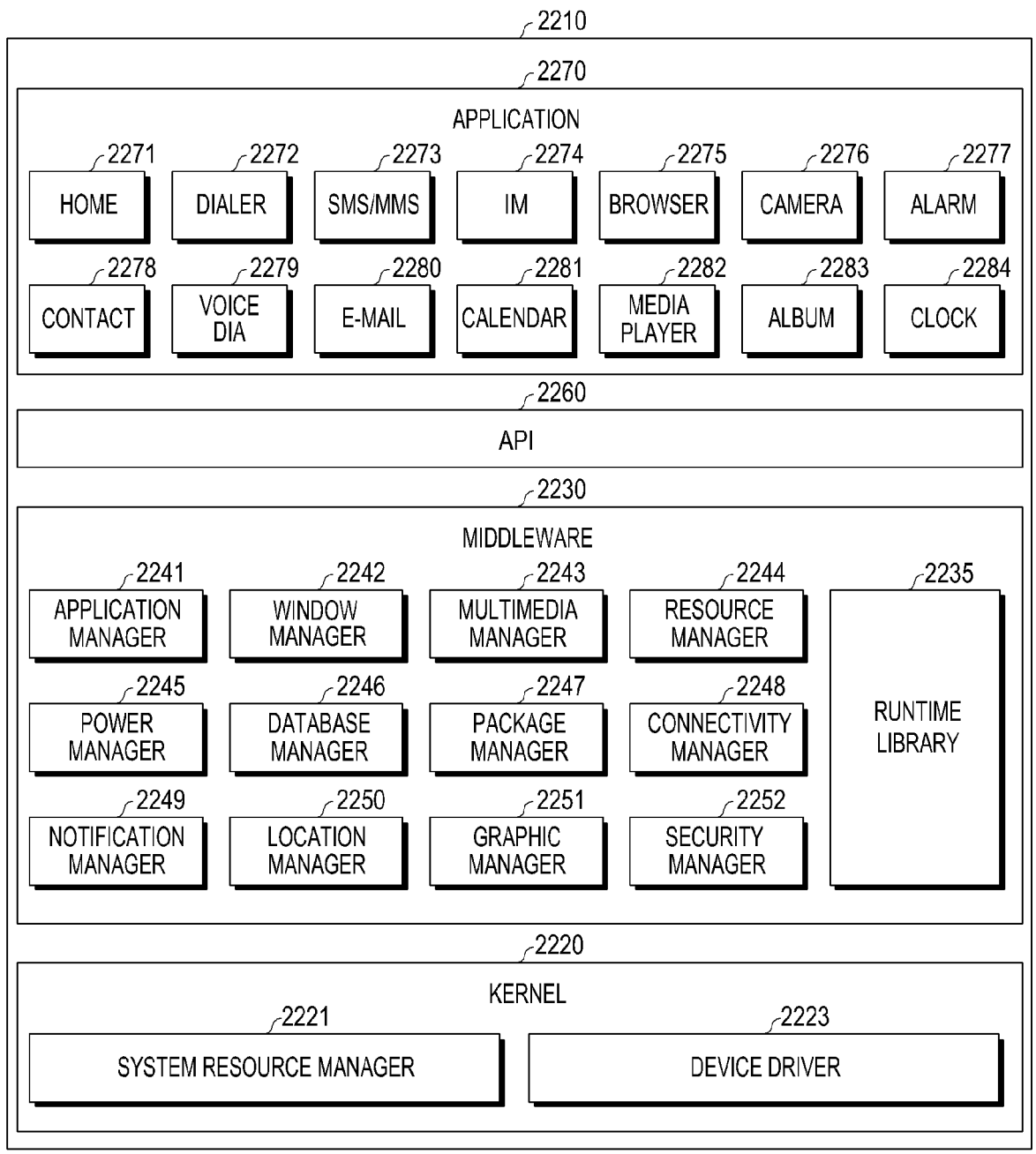
FIG. 22 illustrates a block diagram of a program module according to an embodiment of the present disclosure.

FIG. 22 illustrates a block diagram of a program module according to an embodiment of the present disclosure. According to an embodiment of the present disclosure, the program module 2210 (e.g., the program 140) may include an operating system (OS) controlling resources related to the electronic device (e.g., the electronic device 101) and/or various applications (e.g., the application 147) driven on the operating system. The operating system may include, e.g., Android™, iOS™, Windows™, Symbian™, Tizen™, or Bada™.

Referring to FIG. 22, the program module 2210 may include a kernel 2220 (e.g., the kernel 141), middleware 2230 (e.g., the middleware 143), an API 2260 (e.g., the API 145), and/or an application 2270 (e.g., the application program 147). At least a part of the program module 2210 may be preloaded on the electronic device or may be downloaded from an external electronic device (e.g., the electronic devices 102 and 104 or server 106).

The kernel 2220 may include, e.g., a system resource manager 2221 or a device driver 2223. The system resource manager 2221 may perform control, allocation, or recovery of system resources. According to an embodiment of the present disclosure, the system resource manager 2221 may include a process managing unit, a memory managing unit, or a file system managing unit. The device driver 2223 may include, e.g., a display driver, a camera driver, a Bluetooth driver, a shared memory driver, a USB driver, a keypad driver, a Wi-Fi driver, an audio driver, or an inter-process communication (IPC) driver.

The middleware 2230 may provide various functions to the application 2270 through the API 2260 so that the application 2270 may use limited system resources in the electronic device or provide functions jointly used by applications 2270. According to an embodiment of the present disclosure, the middleware 2230 may include at least one of a runtime library 2235, an application manager 2241, a window manager 2242, a multimedia manager 2243, a resource manager 2244, a power manager 2245, a database manager 2246, a package manager 2247, a connectivity manager 2248, a notification manager 2249, a location manager 2250, a graphic manager 2251, or a security manager 2252.

The runtime library 2235 may include a library module used by a compiler in order to add a new function through a programming language while, e.g., the application 2270 is being executed. The runtime library 2235 may perform input/output management, memory management, or arithmetic function processing.

The application manager 2241 may manage the life cycle of, e.g., the applications 2270. The window manager 2242 may manage GUI resources used on the screen. The multimedia manager 2243 may grasp formats used to play media files and use a codec appropriate for a format to perform encoding or decoding on media files. The resource manager 2244 may manage the source code or memory space of the application 2270. The power manager 2245 may manage, e.g., the battery capability or power and provide power information used for the operation of the electronic device. According to an embodiment of the present disclosure, the power manager 2245 may interwork with a basic input/output system (BIOS). The database manager 2246 may generate, search, or vary a database to be used in the applications 2270. The package manager 2247 may manage installation or update of an application that is distributed in the form of a package file. The connectivity manager 2248 may manage, e.g., wireless connectivity. The notification manager 2249 may provide an event, e.g., arrival message, appointment, or proximity alert, to the user. The location manager 2250 may manage, e.g., locational information on the electronic device. The graphic manager 2251 may manage, e.g., graphic effects to be offered to the user and their related user interface. The security manager 2252 may provide system security or user authentication, for example. According to an embodiment of the present disclosure, the middleware 2230 may include a telephony manager for managing the voice or video call function of the electronic device or a middleware module able to form a combination of the functions of the above-described elements. According to an embodiment of the present disclosure, the middleware 2230 may provide a module specified according to the type of the operating system. The middleware 2230 may dynamically omit some existing components or add new components.

The API 2260 may be a set of, e.g., API programming functions and may have different configurations depending on operating systems. For example, in the case of Android or iOS, one API set may be provided per platform, and in the case of Tizen, two or more API sets may be offered per platform.

The application 2270 may include an application that may provide, e.g., a home 2271, a dialer 2272, an SMS/MMS 2273, an instant message (IM) 2274, a browser 2275, a camera 2276, an alarm 2277, a contact 2278, a voice dial 2279, an email 2280, a calendar 2281, a media player 2282, an album 2283, or a clock 2284, a health-care (e.g., measuring the degree of workout or blood sugar), or provision of environmental information (e.g., provision of air pressure, moisture, or temperature information). According to an embodiment of the present disclosure, the application 2270 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 2270 may include an application (e.g., a health-care application of a mobile medical device) designated according to an attribute of the external electronic device. According to an embodiment of the present disclosure, the application 2270 may include an application received from the external electronic device. At least a portion of the program module 2210 may be implemented (e.g., executed) in software, firmware, hardware (e.g., the processor 210), or a combination of at least two or more thereof and may include a module, program, routine, command set, or process for performing one or more functions.

According to an embodiment of the present disclosure, a method for operating an electronic device including an image sensor and one or more processors may comprise receiving a signal for photography, obtaining a first plurality of image frames for an external object as per a first frame rate through the image sensor in response to the signal, detecting a variation associated with the external object based on the first plurality of image frames, when the variation meets a designated condition, obtaining a second plurality of image frames for the external object as per the first frame rate or a second frame rate and stopping detecting the variation, generating a first portion of a video using at least some of the first plurality of image frames, generating a second portion of the video using at least some of the second plurality of image frames, and after stopping detecting the variation, based on a user input, generating a third portion of the video using at least some of a third plurality of image frames for the external object obtained as per the first frame rate or a third frame rate.

According to an embodiment of the present disclosure, a method for operating an electronic device including an image sensor including a memory and one or more processors may comprise receiving a signal related to video photography, obtaining a first plurality of image frames for an external object as per a first frame rate in response to the signal, storing, in the memory, a designated number of first image frames among the first plurality of image frames, detecting a variation associated with the external object based on at least some of the first plurality of image frames, when the variation meets the designated condition, obtaining a second plurality of image frames for the external object as per the first frame rate or a second frame rate and store the second plurality of image frames in the memory, generating a first portion of the video using second image frames among the first plurality of image frames, and generating a second portion of the video using, at least, at least some of the first image frames and at least some of the second plurality of image frames.

According to an embodiment of the present disclosure, there may be provided a computer readable recording medium recording a program for executing a method for operating an electronic device including an image sensor and one or more processors, the method comprising receiving a signal for photography, obtaining a first plurality of image frames for an external object as per a first frame rate through the image sensor in response to the signal, detecting a variation associated with the external object based on the first plurality of image frames, when the variation meets a designated condition, obtaining a second plurality of image frames for the external object as per the first frame rate or a second frame rate and stopping detecting the variation, generating a first portion of a video using at least some of the first plurality of image frames, generating a second portion of the video using at least some of the second plurality of image frames, and after stopping detecting the variation, based on a user input, generating a third portion of the video using at least some of a third plurality of image frames for the external object obtained as per the first frame rate or a third frame rate.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
an image sensor; and
one or more processors, wherein the one or more processors are configured to:
receive a signal for high-speed photography;
obtain a first plurality of image frames as per a first frame rate through the image sensor in response to the signal for the high-speed photography;
detect a variation associated with an external object included in at least two image frames based on the first plurality of image frames;
in response to the variation associated with the external object meeting a designated condition, obtain a second plurality of image frames as per a second frame rate higher than the first frame rate;
when the variation associated with the external object does not meet the designated condition after obtaining the second plurality of image frames, obtain a third plurality of image frames as per the first frame rate through the image sensor; and
obtain a video including the first plurality of image frames obtained as per the first frame rate, the second plurality of image frames obtained as per the second frame rate, and the third plurality of image frames obtained as per the first frame rate.

2. The electronic device of claim 1, wherein the one or more processors includes a first processor and a second processor, the first processor being included in the image sensor,
wherein the first processor is configured to:
receive the signal for the high-speed photography from the second processor;
obtain the first plurality of image frames as per the first frame rate in response to the signal for the high-speed photography;
detect the variation associated with the external object included in at least two image frames based on the first plurality of image frames;
when the variation associated with the external object meets the designated condition, obtain the second plurality of image frames as per the second frame rate higher than the first frame rate; and
when the variation associated with the external object does not meet the designated condition after obtaining the second plurality of image frames, obtain a third plurality of image frames as per the first frame rate through the image sensor, and
wherein the second processor is configured to
obtain a video including the first plurality of image frames obtained as per the first frame rate, the second plurality of image frames obtained as per the second frame rate, and the third plurality of image frames obtained as per the first frame rate.

3. The electronic device of claim 1, wherein the image sensor further includes a memory, and wherein the one or more processors are further configured to:
store, in the memory, a designated number of first image frames among the first plurality of image frames.

4. The electronic device of claim 3, wherein the one or more processors are further configured to:
select, as per a first ratio related to a frame rate of a first portion of the video and the first frame rate, the designated number of first image frames among the first plurality of image frames; and
store the selected first image frames in the memory.

5. The electronic device of claim 1, wherein the one or more processors are further configured to:
display, on a display, preview image frames as per a third frame rate lower than the first frame rate while obtaining the first plurality of image frames, the second plurality of image frames, and the third plurality of image frames.

6. The electronic device of claim 1, wherein the one or more processors are further configured to:
receive information about a region of interest (ROI) corresponding to at least part of the external object;
identify the ROI from at least one of the first plurality of image frames based on the information; and
detect the variation associated with the external object based on the identified ROI.

7. The electronic device of claim 1, wherein the one or more processors are further configured to:
detect the variation associated with the external object based on image frames obtained after a preset time elapses from a time when the signal for the high-speed photography is received among the first plurality of image frames.

8. A method for operating an electronic device including an image sensor and one or more processors, the method comprising:
- receiving a signal for high-speed photography;
- obtaining a first plurality of image frames as per a first frame rate through the image sensor in response to the signal for the high-speed photography;
- detecting a variation associated with an external object included in at least two image frames based on the first plurality of image frames;
- when the variation associated with the external object meets a designated condition, obtaining a second plurality of image frames as per a second frame rate higher than the first frame rate;
- when the variation associated with the external object does not meet the designated condition after obtaining the second plurality of image frames, obtaining a third plurality of image frames as per the first frame rate through the image sensor; and
- obtaining a video including the first plurality of image frames obtained as per the first frame rate, the second plurality of image frames obtained as per the second frame rate, and the third plurality of image frames obtained as per the first frame rate.

9. A non-transitory computer readable medium embodying a computer program for operating an electronic device including an image sensor and one or more processors, the computer program comprising computer readable program code that, when executed by the one or more processors, cause the electronic device to:
- receive a signal for high-speed photography;
- obtain a first plurality of image frames as per a first frame rate through the image sensor in response to the signal for the high-speed photography;
- detect a variation associated with an external object included in at least two image frames based on the first plurality of image frames;
- when the variation associated with the external object meets a designated condition, obtain a second plurality of image frames as per a second frame rate higher than the first frame rate;
- when the variation associated with the external object does not meet the designated condition after obtaining the second plurality of image frames, obtain a third plurality of image frames as per the first frame rate through the image sensor; and
- obtain a video including the first plurality of image frames obtained as per the first frame rate, the second plurality of image frames obtained as per the second frame rate, and the third plurality of image frames obtained as per the first frame rate.

* * * * *